US008831037B2

(12) United States Patent
Fukushima

(10) Patent No.: US 8,831,037 B2
(45) Date of Patent: Sep. 9, 2014

(54) TRANSMISSION MODULE, RECEPTION MODULE, TRANSMISSION METHOD, RECEPTION METHOD, AND COMMUNICATIONS SYSTEM

(75) Inventor: Keito Fukushima, Tokyo (JP)

(73) Assignee: Olympus Corporation, Tokyo (JP)

( * ) Notice: Subject to any disclaimer, the term of this patent is extended or adjusted under 35 U.S.C. 154(b) by 850 days.

(21) Appl. No.: 13/019,455

(22) Filed: Feb. 2, 2011

(65) Prior Publication Data

US 2011/0188515 A1  Aug. 4, 2011

(30) Foreign Application Priority Data

Feb. 3, 2010  (JP) .................. 2010-022225

(51) Int. Cl.
*H04J 3/16* (2006.01)
*G01R 31/08* (2006.01)
*H04J 3/22* (2006.01)

(52) U.S. Cl.
CPC ...................... *H04J 3/22* (2013.01)
USPC .......................... 370/469; 370/229

(58) Field of Classification Search
None
See application file for complete search history.

(56) References Cited

U.S. PATENT DOCUMENTS

| 6,829,663 | B1 * | 12/2004 | Ghaffari et al. ............ 710/71 |
| 2004/0190523 | A1 * | 9/2004 | Gessner et al. ............ 370/395.4 |
| 2005/0007957 | A1 * | 1/2005 | Ibaraki et al. ............ 370/235 |

FOREIGN PATENT DOCUMENTS

| JP | 2007-81489 A | 3/2007 |
| JP | 2010-532940 A | 10/2010 |
| WO | 2008/157447 A1 | 12/2008 |

OTHER PUBLICATIONS

"Universal Serial Bus Specification"; Compaq, Hewlett-Packard, Intel, Lucent, Microsoft, NEC, Philips, Apr. 27, 2000, pp. ii-xxviii, 1-622 (http://www.usb.org/developers/docs/).
"Universal Serial Bus Specification"; Compaq, Hewlett-Packard, Intel, Lucent, Microsoft, NEC, Philips, Apr. 27, 2000, pp. ii-xxviii, 1-107.
Japanese Office Action dated Nov. 12, 2013, issued in Japanese Patent Application No. 2010-022225, w/English translation, (4 pages).
CIPA, DC-X005-2005, "Picture Transfer Protocol" over TCP/IP networks, CIPA, DC-X005-2005, Japan, Camera & Imaging Products Association, Jul. 28, 2005, pp. 1-28, cited in Japanese Office Action dated Nov. 12, 2013.

* cited by examiner

*Primary Examiner* — Kwang B Yao
*Assistant Examiner* — Tung Q Tran
(74) *Attorney, Agent, or Firm* — Westerman, Hattori, Daniels & Adrian, LLP

(57) ABSTRACT

A transmission module may include a first interface unit that inputs transmission target data and a trigger relating to halting transmission of the transmission data from a processing unit that performs processing in compliance with a communication protocol of an upper layer, a generating unit that generates a communication frame of a transport layer level corresponding to the transmission target data, a second interface unit that transmits the generated communication frame, and a setting unit that, when the trigger is inputted while communication frame corresponding to the transmission target data are being sequentially transmitted, sets a flag indicating the termination of transmission of the transmission target data to communication frame among those being transmitted which do not correspond to a final portion of the transmission target data.

11 Claims, 25 Drawing Sheets

| Field | Description | |
|---|---|---|
| Container Length | SIZE OF THIS CONTAINER | |
| Container Type | CONTAINER TYPE (OPERATION REQUEST) | |
| Code | OPERATION CODE DEFINED BY PTP | |
| TransactionID | TRANSACTION ID | |
| Payload | | |
| | Parameter 1 | OPERATION PARAMETERS |
| | Parameter 2 | |
| | Parameter 3 | |
| | Parameter 4 | |
| | Parameter 5 | |

FIG. 12

| Field | Description |
|---|---|
| Container Length | SIZE OF THIS CONTAINER |
| Container Type | CONTAINER TYPE (DATA) |
| Code | OPERATION CODE SET AT TIME OF OPERATION REQUEST (OPERATION CODE) |
| TransactionID | TRANSACTION ID |
| Payload | DATA DEFINED IN EACH OPERATION |

FIG. 13

| Field | | Description |
|---|---|---|
| Container Length | | SIZE OF THIS CONTAINER |
| Container Type | | CONTAINER TYPE (RESPONSE) |
| Code | | RESPONSE CODE DEFINED BY PTP |
| TransactionID | | TRANSACTION ID |
| Payload | | |
| | Parameter 1 | RESPONSE PARAMETERS |
| | Parameter 2 | |
| | Parameter 3 | |
| | Parameter 4 | |
| | Parameter 5 | |

| Field | Description | |
|---|---|---|
| Container Length | SIZE OF THIS CONTAINER | |
| Container Type | CONTAINER TYPE (EVENT) | |
| Code | EVENT CODE DEFINED BY PTP | |
| TransactionID | TRANSACTION ID | |
| Payload | | |
| | Parameter 1 | EVENT PARAMETERS |
| | Parameter 2 | |
| | Parameter 3 | |

| Field | Description |
|---|---|
| Container Length | SIZE OF THIS CONTAINER |
| Container Type | CONTAINER TYPE (CONTROL REQUEST) |
| Code | Cancel Request |
| TransactionID | TRANSACTION ID OF THE OPERATION DESIRED TO BE CANCELLED |
| Payload | NONE |

FIG. 18
| Field | Description |
| --- | --- |
| Container Length | SIZE OF THIS CONTAINER |
| Container Type | CONTAINER TYPE (CONTROL REQUEST) |
| Code | Reset Request |
| TransactionID | 0X00000000 |
| Payload | NONE |
FIG. 19
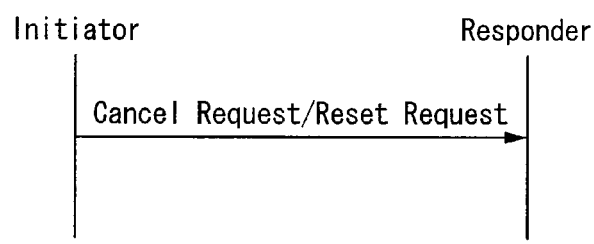
FIG. 20
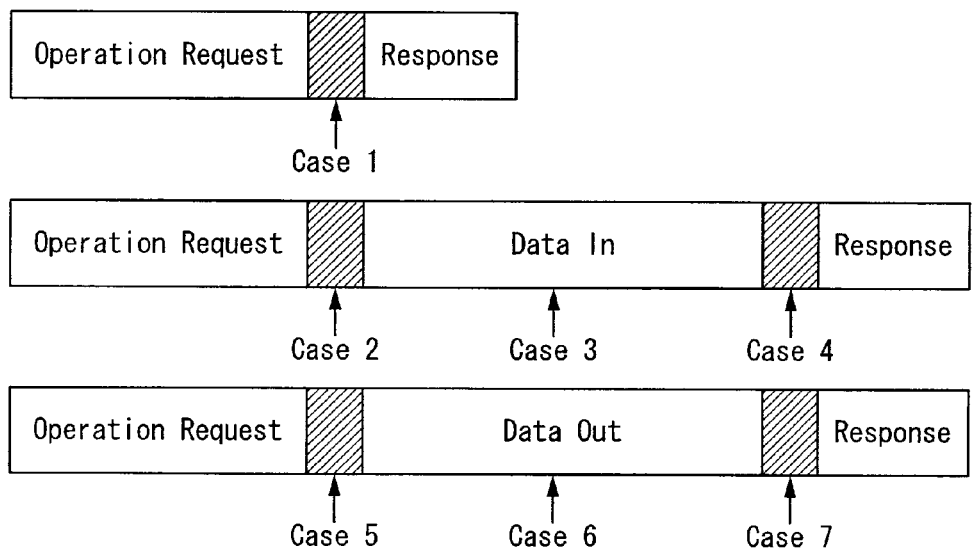

TRANSMISSION MODULE, RECEPTION MODULE, TRANSMISSION METHOD, RECEPTION METHOD, AND COMMUNICATIONS SYSTEM

BACKGROUND OF THE INVENTION

1. Field of the Invention

The present invention relates to a transmission module, a reception module, a transmission method, a reception method, and a communication system.

Priority is claimed on Japanese Patent Application No. 2010-022225, filed Feb. 3, 2010, the content of which is incorporated herein by reference.

2. Description of the Related Art

All patents, patent applications, patent publications, scientific articles, and the like, which will hereinafter be cited or identified in the present application, will hereby be incorporated by reference in their entirety in order to describe more fully the state of the art to which the present invention pertains.

Since Picture Transfer Protocol: ISO/DIS 15740 (hereinafter PTP) can be applied without transport layer dependency, in Universal Serial Bus (USB), USB Still Image Capture Device Class (hereinafter SICD) has been standardized, while in IP networks, CIPA DC-005 "Picture transfer protocol" over TCP/IP networks (hereinafter PTP-IP) has been standardized. Various communications means, both wired and wireless, have recently been developed, and application of PTP is expected to proliferate in the future.

When applying PTP in each transport layer, it must be implemented in accordance with the characteristics of each transport layer. Since cancellation of PTP operation sometimes entails a halt of data transfer, implementation is different for each transport. A method of cancelling a PTP operation when the transport layer is USB (SICD) is as follows.

When the initiator cancels:

Step 1: The initiator halts data transfer (transmission/reception) by halting the issue of USB tokens (in/out tokens).

Step 2: The initiator issues a USB class-specific Cancel Request, and requests cancellation of the PTP operation.

Step 3: The responder cancels the PTP operation being executed.

When the responder cancels:

Step 1: The responder halts data transfer by stalling the bulk-in/out endpoint.

Step 2: The initiator cancels the PTP operation.

In USB, the USB host, namely the initiator, has control rights over all data transfers, and performs transmission/reception of data by using USB tokens (in/out tokens etc.) to poll whether data transfer is possible to the USB device, namely the responder. The responder (USB device) has a halt function of halting data currently being transferred by returning a stall to the USB token issued by the initiator (USB host). A USB specification is disclosed in "Universal Serial Bus Revision 2.0 specification", (http://www.usb.org/developers/docs/).

SUMMARY

A transmission module may include a first interface unit that inputs transmission target data and a trigger relating to halting transmission of the transmission data from a processing unit that performs processing in compliance with a communication protocol of an upper layer, a generating unit that generates a communication frame of a transport layer level corresponding to the transmission target data, a second interface unit that transmits the generated communication frame, and a setting unit that, when the trigger is inputted while communication frame corresponding to the transmission target data are being sequentially transmitted, sets a flag indicating the termination of transmission of the transmission target data to communication frame among those being transmitted which do not correspond to a final portion of the transmission target data.

The transmission module may further include a converting unit that converts the trigger inputted by the first interface unit to information of the transport layer level. The setting unit may set the flag based on the converted information.

The transmission module may further include a converting unit that converts the transmission target data inputted by the first interface unit to information of the transport layer level, a dividing unit that divides the converted information into a plurality of divisions. The generating unit may generate a plurality of the communication frames based on the divided information. The setting unit may set the flag to communication frame corresponding to information among the divided information which does not correspond to a last-end of the divided information.

When the trigger is inputted while the communication frames corresponding to the transmission target data are being sequentially outputted, the second interface unit may transmit information corresponding to the trigger after transmitting a communication frame which the flag was set to.

The second interface unit may receive a second trigger relating to a request to halt the transmission of the transmission target data. The first interface unit may output information corresponding to the second trigger to the processing unit, and input the trigger after that outputting.

A reception module that receives transmission target data may include a second interface unit that receives a communication frame, among a plurality of communication frames corresponding to the transmission target data, which does not correspond to a final portion of the transmission target data, and to which a flag indicating the termination of transmission of the transmission target data has been set, and a first interface unit that, when the second interface unit has received the communication frame to which a flag indicating the end of transmission has been set, outputs information indicating that the transmission of the transmission target data is to be halted to a processing unit that performs processing in compliance with a communication protocol of an upper layer.

After receiving a communication frame to which the flag has been set, the second interface unit may receive a communication frame notifying that the transmission of the transmission target data is halted. The first interface unit may output information corresponding to the notification to the processing unit.

The first interface unit may input a third trigger relating to a request to halt the transmission of the transmission target data. The second interface unit may transmit information corresponding to the third trigger while it is sequentially receiving the transmission target data.

A transmission method may include a step of inputting transmission target data and a trigger relating to halting transmission of the transmission data from a processing unit that performs processing in compliance with a communication protocol of an upper layer, a step of generating a communication frame of a transport layer level corresponding to the transmission target data, a step of transmitting the generated communication frames, and a step of setting a flag indicating the termination of transmission of the transmission target data to communication frames among those being transmitted which do not correspond to a final portion of the transmission target data, when the trigger is inputted while communication frames corresponding to the transmission target data are being sequentially transmitted.

The transmission method may further include a step of converting the inputted trigger to information of the transport layer level, and a step of setting the flag based on the converted information.

The transmission method may further include a step of converting the inputted transmission target data to information of the transport layer level, a step of dividing the converted information into a plurality of divisions, a step of generating a plurality of the communication frames based on the divided information, and a step of setting the flag to communication frame corresponding to information among the divided information which does not correspond to a last-end of the divided information.

The transmission method may further include a step of transmitting information corresponding to the trigger after transmitting a communication frame which the flag was set to, when the trigger is inputted while the communication frames corresponding to the transmission target data are being sequentially outputted.

The transmission method may further include a step of receiving a second trigger relating to a request to halt the transmission of the transmission target data, and a step of outputting information corresponding to the second trigger, and inputting the trigger after that outputting.

A reception method may include a step of receiving a communication frame, among a plurality of communication frames corresponding to the transmission target data, which does not correspond to a final portion of the transmission target data, and to which a flag indicating the termination of transmission of the transmission target data has been set, and a step of outputting information indicating that the transmission of the transmission target data is to be halted to a processing unit that performs processing in compliance with a communication protocol of an upper layer, when the second interface unit has received the communication frame to which a flag indicating the end of transmission has been set.

The reception method may further include a step of receiving a communication frame notifying that the transmission of the transmission target data is halted, after receiving a communication frame to which the flag has been set, and a step of outputting information corresponding to the notification to the processing unit.

The reception method may further include a step of inputting a third trigger relating to a request to halt the transmission of the transmission target data, and a step of transmitting information corresponding to the third trigger while sequentially receiving the transmission target data.

A communication system may include a transmission module including a first interface unit that inputs transmission target data and a trigger relating to halting transmission of the transmission data from a processing unit that performs processing in compliance with a communication protocol of an upper layer, a generating unit that generates one or a plurality of communication frames of a transport layer level corresponding to the transmission target data, a second interface unit that transmits the generated communication frames, and a setting unit that, when the trigger is inputted while communication frames corresponding to the transmission target data are being sequentially transmitted, sets a flag indicating the termination of transmission of the transmission target data to communication frames among those being transmitted which do not correspond to a final portion of the transmission target data, and a reception module including a second interface unit that receives a communication frame, among a plurality of communication frames corresponding to the transmission target data, which does not correspond to a final portion of the transmission target data, and to which a flag indicating the termination of transmission of the transmission target data has been set, and a first interface unit that, when the second interface unit has received the communication frame to which a flag indicating the end of transmission has been set, outputs information indicating that the transmission of the transmission target data is to be halted to a processing unit that performs processing in compliance with a communication protocol of an upper layer.

The transmission module may further include a converting unit that converts the trigger inputted by the first interface unit to information of the transport layer level. The setting unit may set the flag based on the converted information.

The transmission module may further include a converting unit that converts the transmission target data inputted by the first interface unit to information of the transport layer level, a dividing unit that divides the converted information into a plurality of divisions. The generating unit may generate a plurality of the communication frames based on the divided information. The setting unit may set the flag to communication frame corresponding to information among the divided information which does not correspond to a last-end of the divided information.

When the trigger is inputted while the communication frames corresponding to the transmission target data are being sequentially outputted, the second interface unit may transmit information corresponding to the trigger after transmitting a communication frame which the flag was set to.

The second interface unit may receive a second trigger relating to a request to halt the transmission of the transmission target data. The first interface unit may output information corresponding to the second trigger to the processing unit, and inputs the trigger after that outputting.

After receiving a communication frame to which the flag has been set, the second interface unit may receive a communication frame notifying that the transmission of the transmission target data is halted. The first interface unit may output information corresponding to the notification to the processing unit.

The first interface unit may input a third trigger relating to a request to halt the transmission of the transmission target data. The second interface unit may transmit information corresponding to the third trigger while it is sequentially receiving the transmission target data.

BRIEF DESCRIPTION OF THE DRAWINGS

The above features and advantages of the present invention will be more apparent from the following description of certain preferred embodiments taken in conjunction with the accompanying drawings, in which:

FIG. 12 is a schematic diagram illustrating the data configuration of a data container in accordance with the first preferred embodiment of the present invention;

FIG. 13 is a schematic diagram illustrating the data configuration of a response container in accordance with the first preferred embodiment of the present invention;

FIG. 18 is a schematic diagram illustrating the data configuration of a Reset Request in accordance with the first preferred embodiment of the present invention;

FIG. 19 is a sequence diagram illustrating the transmission timings of a Cancel Request and a Reset Request in accordance with the first preferred embodiment of the present invention;

FIG. 20 is a schematic diagram illustrating timings at which an operation can be cancelled in accordance with the first preferred embodiment of the present invention;

DETAILED DESCRIPTION OF THE PREFERRED EMBODIMENTS

In accordance with the first preferred embodiment of the present invention, a first interface unit inputs transmission target data inputted from a processing unit that performs processing in compliance with a communication protocol of an upper layer. From this transmission target data a generating unit generates a communication frame of a transport layer level, and a second interface unit outputs this communication frame. At this time, when the first interface unit inputs a trigger relating to halting the transmission of the transmission target data from the processing unit that performs processing in compliance with a communication protocol of an upper layer, a setting unit sets a flag indicating the termination of the transmission of the transmission target data to communication frames among those being transmitted which do not correspond to a final portion of the transmission target data. The second interface unit then outputs communication frames of a transport layer level to which a flag indicating termination of the transmission of the transmission target data has been set.

Therefore, even if a transmission module performs communication using a transport layer protocol which lacks an existing function of having control of data transfer, when the transmission module halts the data transmission, the target communication device can confirm that data transfer has been halted.

The present invention will be now described herein with reference to illustrative embodiments. Those skilled in the art will recognize that many alternative embodiments can be accomplished using the teaching of the present invention and that the present invention is not limited to the embodiments illustrated for explanatory purpose.

A first preferred embodiment of the present invention will be explained with reference to the drawings. This embodiment is an example in which an electronic camera and a personal computer (PC) transmit and receive data to and from each other, and this transmission and reception of data is halted.

Figure 1:
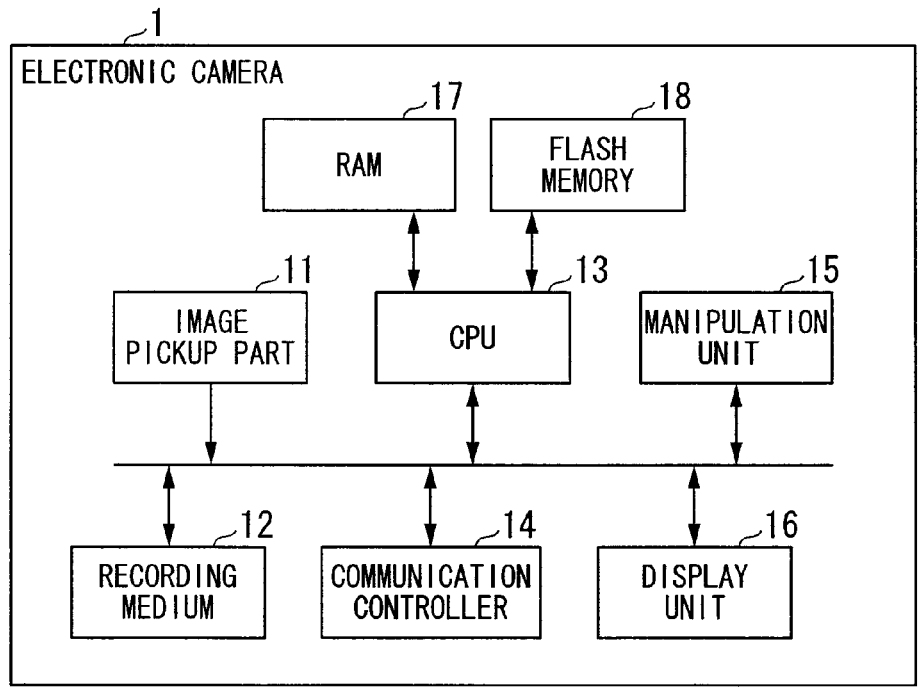
FIG. 1 is a block diagram illustrating the configuration of an electronic camera in accordance with a first preferred embodiment of the present invention.

FIG. 1 is a block diagram illustrating the configuration of an electronic camera in this embodiment. In the example of FIG. 1, an electronic camera 1 includes an image pickup part 11, a recording medium 12, a CPU 13, a communication controller 14 (transmission module, reception module), a manipulation unit 15, a display unit 16, a RAM 17, and a flash memory 18.

The CPU 13 reads and executes control programs stored in the flash memory 18, and reads/writes various types of data to and from the RAM 17, and thereby integrally controls the operation of each part of the electronic camera 1. In addition to the control programs, image-capturing parameters, communication parameters (data communication protocol information, etc.), and the like are stored in the flash memory 18.

The image pickup part 11 takes an image of a subject to generate an image pickup signal, and performs various image processes to create image data. Image data created by the image pickup part 11 is stored in the recording medium 12. As the recording medium 12 it is possible to use, for example, a memory card that can be detachably attached to the electronic camera 1, or a hard disk that is secured to the electronic camera 1, etc.

The manipulation unit 15 includes a manipulation switch and the like for inputting commands relating to the operation of the electronic camera 1. The display unit 16 displays image data read from the recording medium 12, a user interface screen, etc. The communication controller 14 is a communication interface that performs providing and receiving of data such as captured images with an external appliance such as an external recording device. Here, 'communication interface' denotes an interface widely used in transmitting and receiving information; it is not limited to wired communication and also includes wireless communications such as wireless LAN (WLAN), Bluetooth™, IrDA™, TransferJet™, WiMedia™.

Figure 2:
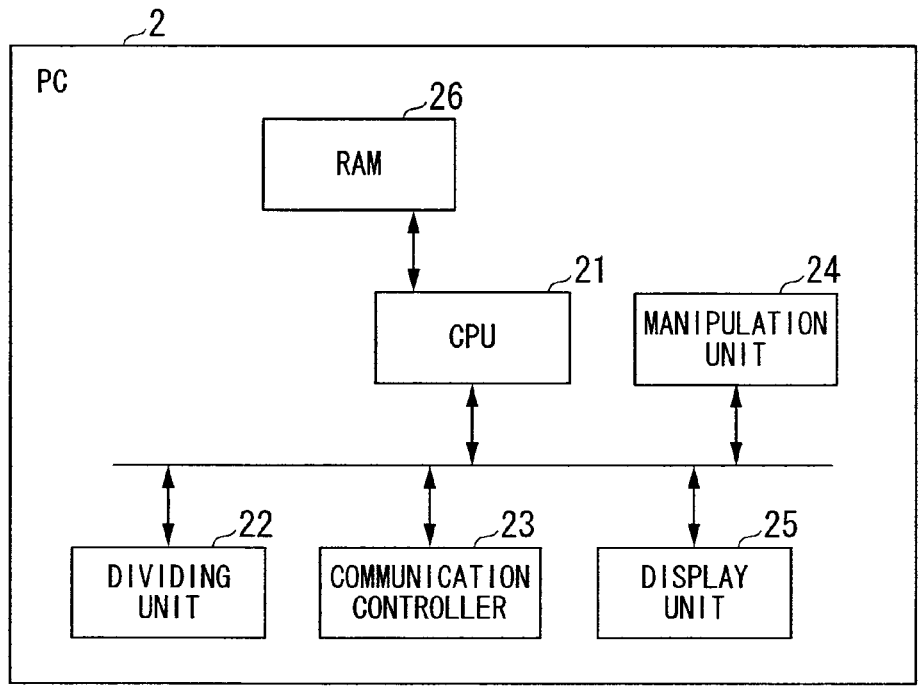
FIG. 2 is a block diagram illustrating the configuration of a PC in accordance with the first preferred embodiment of the present invention.

Subsequently, the configuration of the PC will be explained. FIG. 2 is a block diagram of the configuration of a PC in this embodiment. In the example of FIG. 2, a PC 2 includes a CPU 21, a recording medium 22, a communication controller 23 (transmission module, reception module), a manipulation unit 24, a display unit 25, and a RAM 26.

The CPU 21 reads and executes control programs stored in the recording medium 22, and reads/writes various types of data to and from the RAM 26, and thereby integrally controls the operation of each part of the PC 2. For example, a hard disk or a flash memory is used as the recording medium 22. In addition to the control programs, image-capturing parameters, various types of data such as text data and image data are stored in the recording medium 22.

The manipulation unit 24 includes a keyboard, a mouse, and the like for inputting commands relating to the operation of the PC 2. The display unit 25 displays text data, image data, and the like read from a recording medium, a user interface screen, etc. The communication controller 23 is a communication interface that performs providing and receiving of various types of data with an external appliance such as the electronic camera 1 or a printer. Here, 'communication interface' denotes an interface widely used in transmitting and receiving information; it is not limited to wired communication and also includes wireless communications such as wireless LAN (WLAN), Bluetooth™, IrDA™, TransferJet™, WiMedia™.

Figure 3:
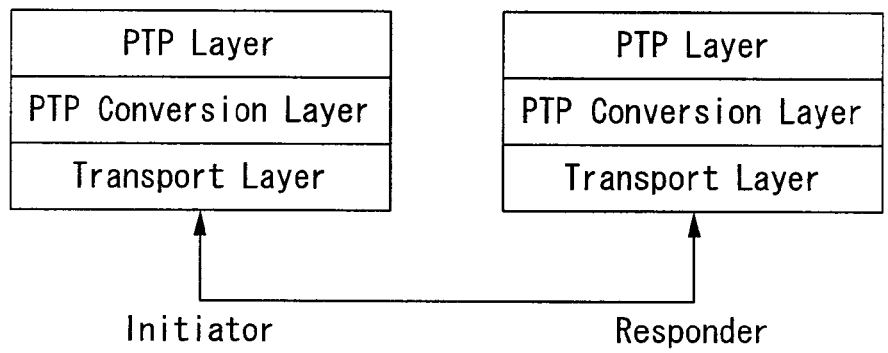
FIG. 3 is a layer diagram showing layers of a communication protocol used by a communication controller in accordance with the first preferred embodiment of the present invention.

Subsequently, a communication protocol used by the communication controller 14 of the electronic camera 1 and the communication controller 23 of the PC 2 will be explained. FIG. 3 is a layer diagram showing layers of a communication protocol used by the communication controller 14 of the electronic camera 1 and the communication controller 23 of the PC 2 in this embodiment. PTP devices function as initiators and responders. The responder responds to operation requests from the initiator to transfer images and control the device. In this embodiment, the PC 2 performs the function of the initiator, and the electronic camera 1 functions as the responder.

The communication protocol layer of this embodiment includes, in sequence from the upper layer: a PTP layer, a transport layer, and a PTP conversion layer. The PTP layer realizes PTP. The PTP conversion layer is a layer that mutually converts data such as operations/data/responses/events according to ISO-15740 so that they can be used between the PTP layer and the transport layer. When the transport layer is used as a USB, the PTP conversion layer denotes the SICD.

The transport layer is a communication means (transport) that physically transfers data. The transport layer is not limited to wired communication such as USB and Ethernet™, and also includes wireless communications such as WLAN and IrDA™, TransferJet™, etc.

Subsequently, the communication controller 14 of the electronic camera 1 and the communication controller 23 of the PC 2 will be explained.

Figure 4:
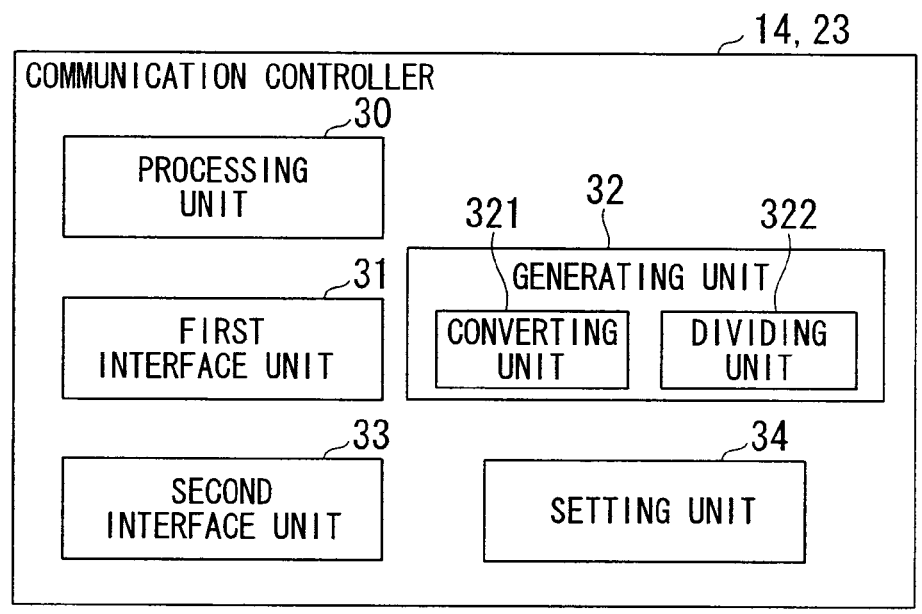
FIG. 4 is a block diagram illustrating the configuration of a communication controller in accordance with the first preferred embodiment of the present invention.

The configuration of the communication controller 14 and the configuration of the communication controller 23 are the same. FIG. 4 is a block diagram illustrating the configuration of the communication controller 14 of the electronic camera 1 and the communication controller 23 of the PC 2 in this embodiment.

In the example of FIG. 4, the communication controllers 14 and 23 each include a processing unit 30 that performs processing in compliance with an upper-layer communication protocol (PTP layer), a first interface unit 31 (transmission side first interface unit, reception side first interface unit) that inputs requests such as a request for data transmission from the processing unit 30 or a request to halt data transmission, a generating unit 32 that generates a communication frame of a transport layer level (a communication frame shown below in FIGS. 5 and 6 etc.), a second interface unit 33 (transmission side second interface unit, reception side second interface unit) that outputs the communication frame generated by the generating unit 32 to a communication protocol of a lower layer, and a setting unit 34 that sets a flag indicating the termination of the transmission of the transmission target data. The generating unit 32 includes a converting unit 321 that converts transmission target data and a trigger relating to halting the transmission of the transmission target data to information of a transport layer level, and a dividing unit 322 that divides transmission target data that the converting unit 321 converted to information of a transport layer level, in accordance with the size of the communication frame of the transport layer level. In this embodiment, a more fragment (MF) is used as the flag indicating the termination of the transmission of transmission target data.

The processing unit 30 of each of the communication controllers 14 and 23 performs processes stipulated by the PTP layer, the first interface unit 31 performs processes stipulated by the PTP conversion layer, and the second interface unit 33 performs processes stipulated by the transport layer. The generating unit 32 and the setting unit 34 of each of the communication controllers 14 and 23 operate at one or both of the PTP conversion layer and the transport layer. For example, it is acceptable if the converting unit 321 of the generating unit 32 operates at the PTP conversion layer and the dividing unit 322 operates at the transport layer.

Figure 5:
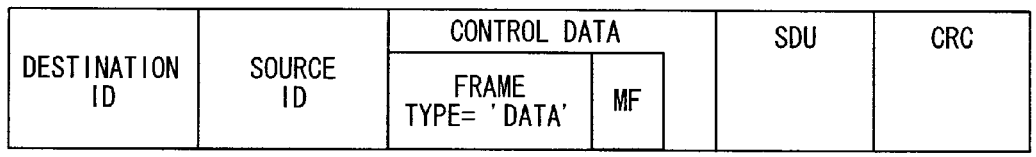
FIG. 5 is a schematic diagram illustrating the configuration of a data frame in accordance with the first preferred embodiment of the present invention.

Subsequently, the configuration of a data frame in this embodiment will be explained. FIG. 5 is a schematic view illustrating the configuration of a data frame in this embodiment. A data frame is a communication frame used for transmitting data of which transmission has been requested from an upper-layer communication protocol to a target device. The data frame contains a destination ID, a source ID, control data, a service data unit (SDU), and a cyclic redundancy check (CRC).

An identifier (ID) of a target device that transmits the message is set as the destination ID. If the target device is unidentified such as in the case of a connection request message, a special identifier such as FF-FF-FF-FF-FF-FF-FF-FF is set. An identifier of the self device is set as the source ID. A frame type ('data' in the present data frame), a More Frame (MF) flag, and such like are set as the control data. The MF flag is used when dividing and transmitting data; MF=1 indicates that there is a following data frame, and MF=0 indicates that there is no following frame. data of which transmission has been requested from the upper-layer communication protocol that performs transmission is set as the SDU. This frame data is also called a protocol data unit (PDU). A value for detecting that there is no error in the values set in the data frame is set as the CRC.

Figure 6:
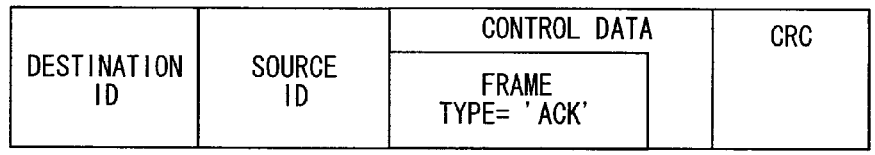
FIG. 6 is a schematic diagram illustrating the configuration of an ACK frame in accordance with the first preferred embodiment of the present invention.

Subsequently, the configuration of an acknowledgement (ACK) frame in this embodiment will be explained. FIG. 6 is a schematic diagram illustrating the configuration of an ACK frame in this embodiment. The ACK frame is used for notifying that a frame transmitted from a target device has been received. The ACK frame contains a destination ID, a source ID, control data, and a CRC. The destination ID, the source ID, and the CRC are the same as those of the data frame. 'ACK' is set as the frame type of the control data in the ACK frame.

Figure 7:
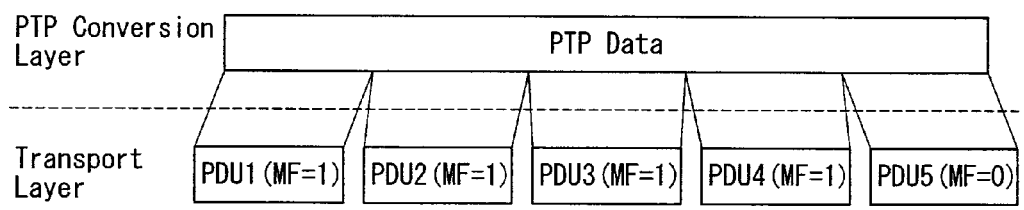
FIG. 7 is a schematic diagram illustrating an example of division of PTP data in accordance with the first preferred embodiment of the present invention.

Subsequently, a method of dividing PTP data will be explained. FIG. 7 is a schematic diagram illustrating a division of PTP data in this embodiment. When the size of the PTP data of which transmission has been requested from a PTP conversion layer exceeds the maximum SDU size of the transport layer, the transport layer uses the MF flag to divide and transfer the data. In the example of FIG. 7, the PTP data is divided into PDU1 to PDU5. The MF of the control data in each of PDU1 to PDU4 is 1 (MF=1), indicating that each has a following data frame. The MF of the control data in PDU5 is 0 (MF=0), indicating that PDU5 is the final data frame.

Figure 8:
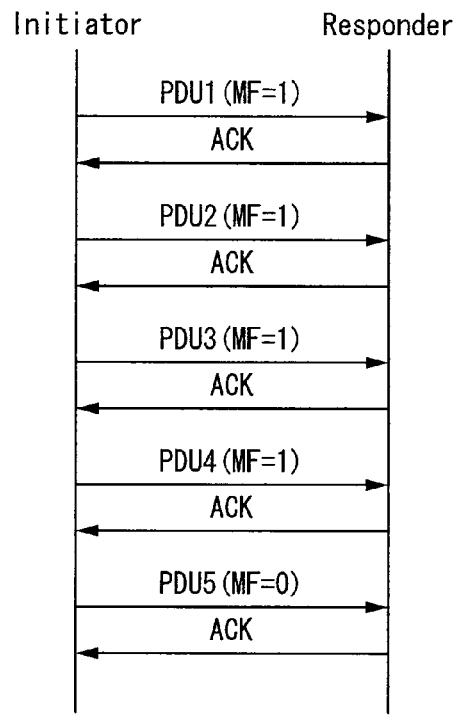
FIG. 8 is a sequence diagram illustrating the transmission sequence of data when transmitting a PDU from an initiator to a responder in accordance with the first preferred embodiment of the present invention.

Subsequently, a transmission sequence when transmitting data (a PDU) from the initiator to the responder will be explained. FIG. 8 is a sequence diagram illustrating a transmission sequence when transmitting a PDU from the initiator to the responder in this embodiment. In the example of FIG. 8, the initiator transmits PDU1 to PDU5 to the responder.

The initiator transmits PDU1 (MF=1) to the responder. Having received PDU1 (MF=1), the responder transmits an ACK notifying that PDU1 (MF=1) has been received to the initiator. Since an MF of the received PDU1 is set to 1, the responder stands by until the data frame that follows PDU1 (MF=1) is transmitted from the initiator.

When the initiator receives the ACK for PDU1 (MF=1) from the responder, it transmits data frame that follows PDU1 (MF=1), namely PDU2 (MF=1), to the responder. Having received PDU2 (MF=1), the responder performs a similar operation as when it received PDU1 (MF=1) and transmits an ACK notifying that PDU2 (MF=1) has been received to the initiator. Since an MF of the received PDU2 is set to 1, the responder stands by until the data frame that follows PDU2 (MF=1) is transmitted from the initiator. The initiator and the responder then perform similar transmit/receive operations for PDU3 (MF=1) and PDU4 (MF=1).

When the initiator receives the ACK for PDU4 (MF=1) from the responder, it transmits the data frame that follows PDU4 (MF=1), namely PDU5 (MF=0) to the responder. Having received PDU5 (MF=0), the responder transmits an ACK notifying the initiator that it has received PDU5 (MF=0). Since the MF of PDU5 is 0, indicating that there is no following data frame, the responder ends the reception process. When the initiator receives an ACK for PDU5 (MF=0) from the responder, it ends the transmission process. Thus the responder that receives the data ends the reception process when it receives the PDU with an MF that is set to 0.

Figure 9:
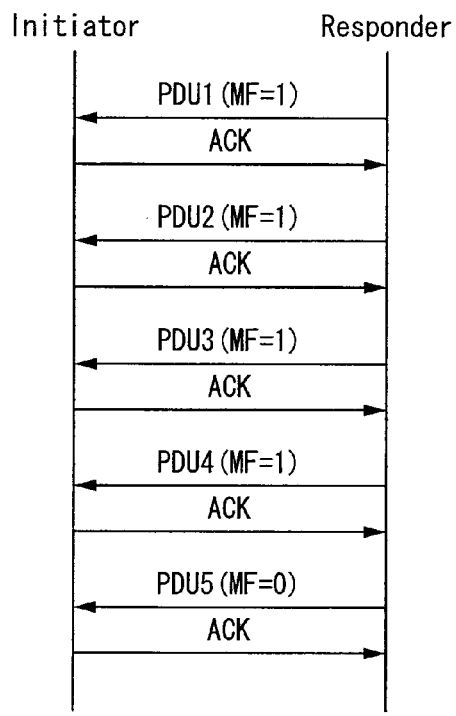
FIG. 9 is a sequence diagram illustrating the transmission sequence of data when transmitting a PDU from a responder to an initiator in accordance with the first preferred embodiment of the present invention.

Subsequently, a transmission sequence when transmitting data (a PDU) from the responder to the initiator will be explained. FIG. 9 is a sequence diagram illustrating a transmission sequence when transmitting a PDU from the responder to the initiator in this embodiment. In the example of FIG. 9, the responder transmits PDU1 to PDU5 to the initiator.

The responder transmits PUD1 (MF=1) to the initiator. The initiator receives PDU1 (MF=1) and transmits an ACK to notify the responder that it has received PDU1 (MF=1). Also, since an MF of the received PDU1 is set to 1, the initiator stands by until the data frame that follows PDU1 (MF=1) is transmitted from the responder.

When the responder receives the ACK for PDU1 (MF=1) from the initiator, it transmits the data frame that follows PDU1 (MF=1), namely PDU2 (MF=1) to the initiator. Having received PDU2 (MF=1), the initiator transmits an ACK notifying that the PDU2 (MF=1) has been received, as it did when it received PDU1 (MF=1), and stands by until the data frame that follows PDU2 (MF=1) is transmitted from the responder. The initiator and the responder then perform similar transmit/receive operations for PDU3 (MF=1) and PDU4 (MF=1) as they did for PDU2 (MF=1).

When the responder receives the ACK for PDU4 (MF=1) from the initiator, it transmits the data frame that follows PDU4 (MF=1), namely PDU5 (MF=0) to the initiator. Having received PDU5 (MF=0), the initiator transmits an ACK notifying the responder that it has received PDU5 (MF=0). Since the MF of PDU5 is 0, indicating that there is no following data frame, the initiator ends the reception process. When the responder receives an ACK for PDU5 (MF=0) from the initiator, it ends the transmission process. Thus the initiator that receives the data ends the reception process when it receives the PDU with an MF that is set to 0.

Figures 10, 11:
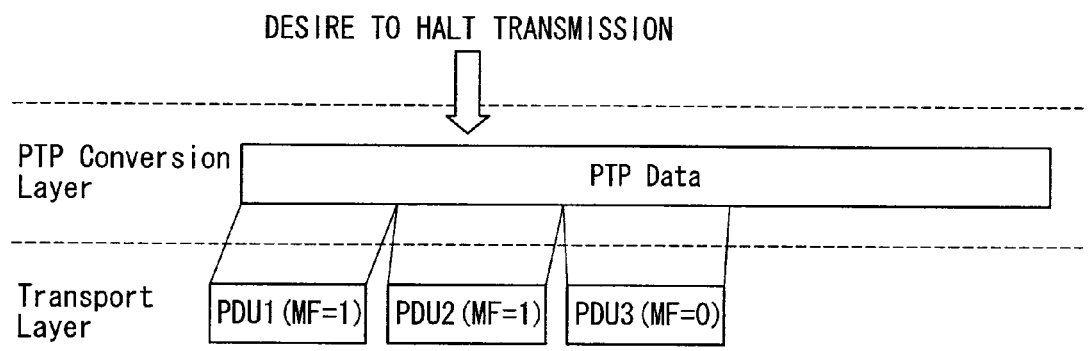
FIG. 10 is a schematic diagram illustrating a method of halting a transmission of PTP data while it is being transmitted in accordance with the first preferred embodiment of the present invention.
FIG. 11 is a schematic diagram illustrating the data configuration of an operation request container in accordance with the first preferred embodiment of the present invention.

Subsequently, a method of halting the transmission of PTP data while it is being transmitted, performed by the communication controllers 14 and 23, will be explained. FIG. 10 is a schematic diagram illustrating a method of halting a transmission of PTP data while it is being transmitted in this embodiment. In the example of FIG. 10, the transmission of PTP data is halted while the PTP data is being divided into PDUs and PDU2 is being transmitted.

As described in FIGS. 8 and 9, the initiator or responder that is receiving data ends the reception process when it receives a PDU with an MF that is set to 0. Accordingly, when one of the communication controllers 14 and 23 halts transmission of PTP data, it sets the MF of the data frame after the one currently being transmitted to 0, thereby notifying the transmission destination that it is going to halt data transmission. The communication controllers 14 and 23 then end the transmission process without transmitting the PDU that was intended to be transmitted next.

More specifically, a generating unit 32 of the communication controllers 14 and 23 generates a communication frame (e.g. a PDU) of a transport layer level by converting and dividing the transmission target data inputted to the first interface unit 31 from the processing unit 30 in compliance with an upper-layer communication protocol (e.g. a PTP layer), and a second interface unit 33 outputs the communication frame generated by the generating unit 32.

At this time, if a trigger (e.g. a request or a Reset Request) for halting the transmission of the transmission target data is inputted to the first interface unit 31 from the processing unit 30 of the communication controller 14 or 23, the generating unit 32 converts this trigger to information of the transport layer level. Based on the information converted by the generating unit 32, a setting unit 34 of the communication controllers 14 and 23 sets a flag (e.g. MF=0) indicating halt of the transmission to the communication frame of the transport layer level that is to be transmitted next by the second interface unit 33. The second interface unit 33 then transmits the transport layer level communication frame, to which the setting unit 34 set the flag indicating the end of transmission.

When the second interface unit 33 of the communication controllers 14 and 23 receives a communication frame of the transport layer level with a flag indicating the end of transmission set thereto, the first interface unit 31 outputs information indicating that transmission of the target data being transmitted from the target communication device is to be halted to the processing unit 30 that performs processing in compliance with the upper-layer communication protocol. This enables the communication controllers 14 and 23 to notify and confirm that data transmission is halted.

In the example of FIG. 10, the communication controllers 14 and 23 set the MF of PDU3, which comes after PDU2 (MF=1) currently being transmitted, to 0, and transmit PDU3 (MF=0). The communication controllers 14 and 23 end the transmission process without transmitting the PDU that was expected to be transmitted thereafter.

After halting the transmission of the transmission target data, the communication controllers 14 and 23 can receive/transmit upper layer information relating to a trigger (e.g. Cancel Request, cancel transaction, Reset Request, response, etc.).

When the second interface unit 33 of the communication controllers 14 and 23 has received a trigger relating to a request to halt the transmission of the transmission target data (e.g. event (cancel transaction)) from the target communication device who is transmitting it, the first interface unit 31 outputs information corresponding to the second trigger to the processing unit 30 that performs processing in compliance with an upper-layer communication protocol, and then receives the input of the trigger relating to halting transmission of the target data. This enables the one of the communication controllers 14 and 23 that is receiving the data to notify the one that is transmitting the data that it is halting the transmission.

Subsequently, PTP data will be explained. The PTP conversion layer converts an operation request, data, a response, and an event of which transmission is requested from a PTP layer to their respective containers, and transmits/receives these containers as PTP data to the transport layer.

FIG. 11 is a schematic diagram illustrating the data structure of an operation request container obtained by converting an operation request. In the example of FIG. 11, the operation request container has these fields: Container length, Container type, Code, Transaction ID, Payload.

Container length stores the size of the container. Container type stores the type (operation request) of the container. Code stores the operation code defined in the PTP. Transaction ID stores a transaction ID as an identifier for uniquely identifying the transaction. Payload stores the operation parameters. In the example of FIG. 11, Payload stores five operation parameters 1 to 5.

FIG. 12 is a schematic diagram illustrating the data structure of a data container obtained by converting data. In the example of FIG. 12, the data container includes the fields: Container length, Container type, Code, Transaction ID, and Payload.

Container length stores the size of the container. Container type stores the type (data) of the container. Code stores the code (operation code) that was set when the operation request was made. Transaction ID stores a transaction ID as an identifier for uniquely identifying the transaction. Payload stores the data defined in each operation.

FIG. 13 is a schematic diagram illustrating the data structure of a response container obtained by converting a response. In the example of FIG. 13, the response container includes the fields: Container length, Container type, Code, Transaction ID, and Payload.

Container length stores the size of the container. Container type stores the type (response) of the container. Code stores a response code defined by the PTP. Transaction ID stores a transaction ID as an identifier for uniquely identifying the transaction. Payload stores the response parameters. In the example of FIG. 13, Payload stores five parameters 1 to 5.

Figures 14, 15:
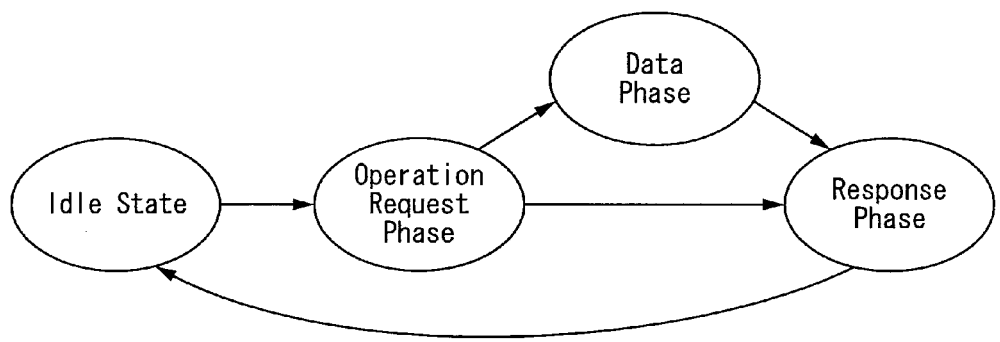
FIG. 14 is a schematic diagram illustrating the data configuration of an event container in accordance with the first preferred embodiment of the present invention.
FIG. 15 is a transition diagram illustrating the transaction state of an operation in accordance with the first preferred embodiment of the present invention.

FIG. 14 is a schematic diagram illustrating the data structure of an event container obtained by converting an event. In the example of FIG. 14, the event container has the fields: Container length, Container type, Code, Transaction ID, and Payload.

Container length stores the size of the container. Container type stores the type (event) of the container. Code stores an event code defined by the PTP. Transaction ID stores a transaction ID as an identifier for uniquely identifying the transaction. Payload stores the event parameters. In the example of FIG. 14, Payload stores three parameters 1 to 3.

Subsequently, the transaction state of an operation will be explained.

FIG. 15 is a transition diagram illustrating the transaction states of an operation in this embodiment. The operation is executed by transition through each of these transaction states: idle state, operation request phase, data phase, response phase.

In idle state, no operation is executed while the responder waits for an operation request. In operation request phase, an operation request is transmitted. In data phase, data defined in each operation is transmitted/received. Since some operations do not involve data transfer, sometimes there is no data phase. In response phase, the result of the operation is sent in response.

Figures 16, 17:
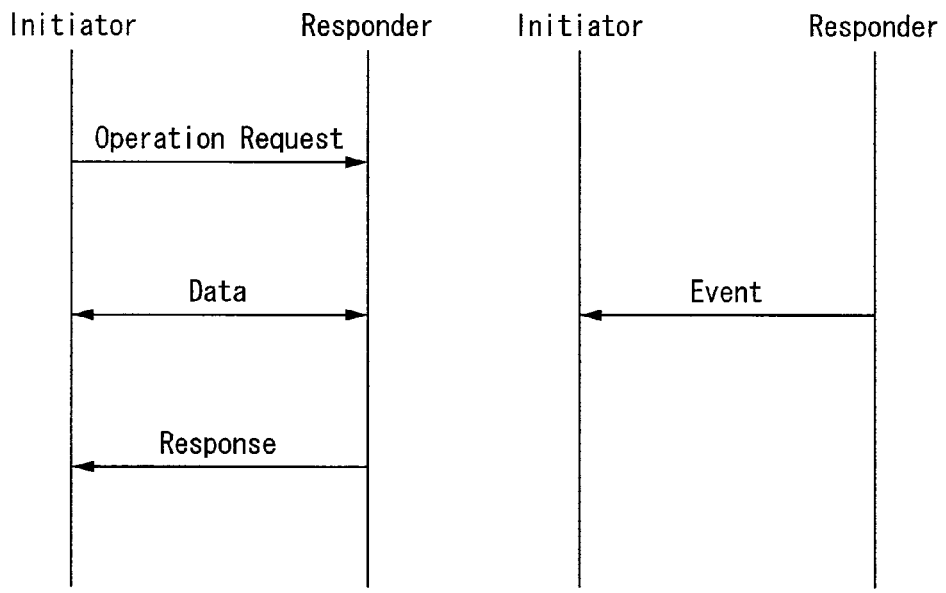
FIG. 16 is a sequence diagram illustrating the transmission timings of an operation request, data, a response, and an event in accordance with the first preferred embodiment of the present invention.
FIG. 17 is a schematic diagram illustrating the data configuration of a Cancel Request in accordance with the first preferred embodiment of the present invention.

Subsequently, the transmission timings of an operation request, data, a response, and an event will be explained. FIG. 16 is a sequence diagram illustrating the transmission timings of an operation request, data, a response, and an event.

An operation request is transmitted when the initiator requests an operation to the responder. Data for the requested operation is transmitted. Depending on the operation, the data is transmitted from the initiator to the responder, or from the responder to the initiator; sometimes there is no data. An event is transmitted when the responder notifies the initiator of an event, and can be transmitted asynchronously irrespective of the transaction state.

Subsequently, a Cancel Request and a Reset Request will be explained. The initiator uses a Cancel Request when cancelling an operation. A responder that receives a Cancel Request cancels the operation being executed. The initiator uses a Reset Request when resetting a device. A responder that receives a Reset Request cancels any operation being executed, and shifts its transaction state to the idle state.

Cancel Request and Reset Request are control requests unique to the transport and are not defined by PTP specifications. A control request is issued from the initiator to the responder. The PTP conversion layer is transmitted/received to and from the transport layer with the control request transmitted from the PTP layer (Cancel Request, Reset Request) as its PTP data.

FIG. 17 is a schematic diagram illustrating the data structure of a Cancel Request. In the example of FIG. 17, the Cancel Request has the fields: Container length, Container type, Code, Transaction ID, Payload.

Container length stores the size of the container. Container type stores the type (control request) of the container. Code stores the Cancel Request. Transaction ID stores a transaction ID of the operation desired to be cancelled. Payload can be omitted, since there is no information to be stored in it.

FIG. 18 is a schematic diagram illustrating the data structure of a Reset Request. In the example of FIG. 18, the Reset Request has the fields: Container length, Container type, Code, Transaction ID, Payload.

Container length stores the size of the container. Container type stores the type (control request) of the container. Code stores the Reset Request. Transaction ID stores 0x000000000. Payload can be omitted, since there is no information to be stored in it.

Subsequently, the transmission timings of the Cancel Request and the Reset Request will be explained. FIG. 19 is a sequence diagram illustrating the transmission timings of the Cancel Request and the Reset Request. The Cancel Request and the Reset Request are transmitted from the initiator to the responder, and can be transmitted asynchronously irrespective of the transaction state.

Subsequently, timings at which an operation can be cancelled will be explained. FIG. 20 is a schematic diagram illustrating timings at which an operation can be cancelled in this embodiment. The example of FIG. 20 illustrates cancellation timings of case 1 to case 7.

In case 1, an operation is cancelled immediately after transmitting an operation request with no data transmission/reception. In case 2, an operation is cancelled immediately after transmitting an operation request with data reception. In case 3, an operation is cancelled during data reception. In case 4, an operation is cancelled immediately after ending data reception. In case 5, an operation is cancelled immediately after transmitting an operation request with data transmission. In case 6, an operation is cancelled during data transmission. In case 7, an operation is cancelled immediately after completing data transmission.

Subsequently, the operation cancellation sequence performed by the initiator when using a Cancel Request in cases 1 to 7 will be explained.

Figure 21:
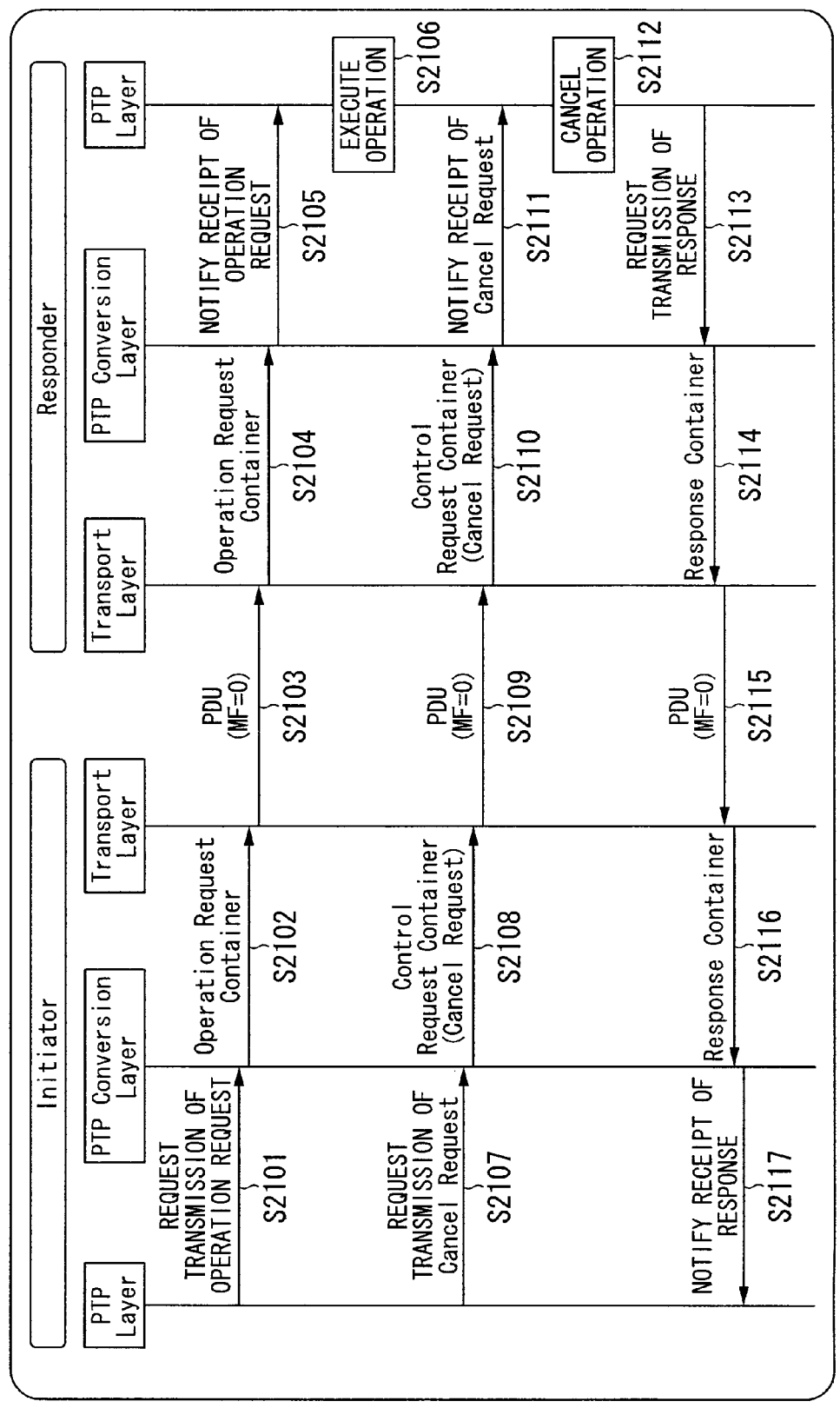
FIG. 21 is a sequence diagram illustrating the cancellation sequence of an operation by an initiator when a Cancel Request is used in case 1, case 2, and case 5 in accordance with the first preferred embodiment of the present invention.

FIG. 21 is a sequence diagram illustrating the cancellation sequence of an operation by the initiator when a Cancel Request is used in case 1, case 2, and case 5 of this embodiment.

(Step S2101)
The PTP layer of the initiator makes a request to the PTP conversion layer of the initiator to transmit an operation request.

(Step S2102)
The PTP conversion layer of the initiator converts the operation request to an operation request container.

(Step S2103)
The transport layer of the initiator converts the operation request container to a PDU (MF=0) and transmits it to the responder.

(Step S2104)
The transport layer of the responder receives the transmitted PDU (MF=0) and converts it to an operation request container.

(Step S2105)
The PTP conversion layer of the responder notifies the PTP layer of the responder that it has received the operation request.

(Step S2106)
The PTP layer of the responder executes the operation.

(Step S2107)
The PTP layer of the initiator requests the PTP conversion layer of the initiator to transmit a Cancel Request in order to cancel the operation.

(Step S2108)
The PTP conversion layer of the initiator converts the Cancel Request to a control request container (Cancel Request).

(Step S2109)
The transport layer of the initiator converts the control request container (Cancel Request) to a PDU (MF=0), and transmits it to the responder.

(Step S2110)
The transport layer of the responder receives the transmitted PDU (MF=0), and converts it to a control request container (Cancel Request).

(Step S2111)
The PTP conversion layer of the responder notifies the PTP layer of the responder that it has received a Cancel Request.

(Step S2112)
The PTP layer of the responder cancels the operation.

(Step S2113)
The PTP layer of the responder, in order to give Notify receipt of it has cancelled the operation, requests the PTP conversion layer of the responder to set the Code to a response code of 'transaction cancelled', and transmit a response.

(Step S2114)
The PTP conversion layer of the responder converts the response to a response container.

(Step S2115)
The transport layer of the responder converts the response container to a PDU (MF=0), and transmits it to the initiator.

(Step S2116)
The transport layer of the initiator receives the transmitted PDU (MF=0), and converts it to a response container.

(Step S2117)

The PTP conversion layer of the initiator notifies the PTP layer of the initiator that it has received the response.

As described above, operations in case 1, case 2, and case 5 can be cancelled by implementing the following sequence:
1. The initiator transmits a Cancel Request.
2. The responder cancels the operation.
3. The responder sets the Code to a response code of 'transaction cancelled' and transmits a response.

In case 2, the responder can transmit data (PDU) with More Frame set at 0 before transmitting the response.

Figure 22:
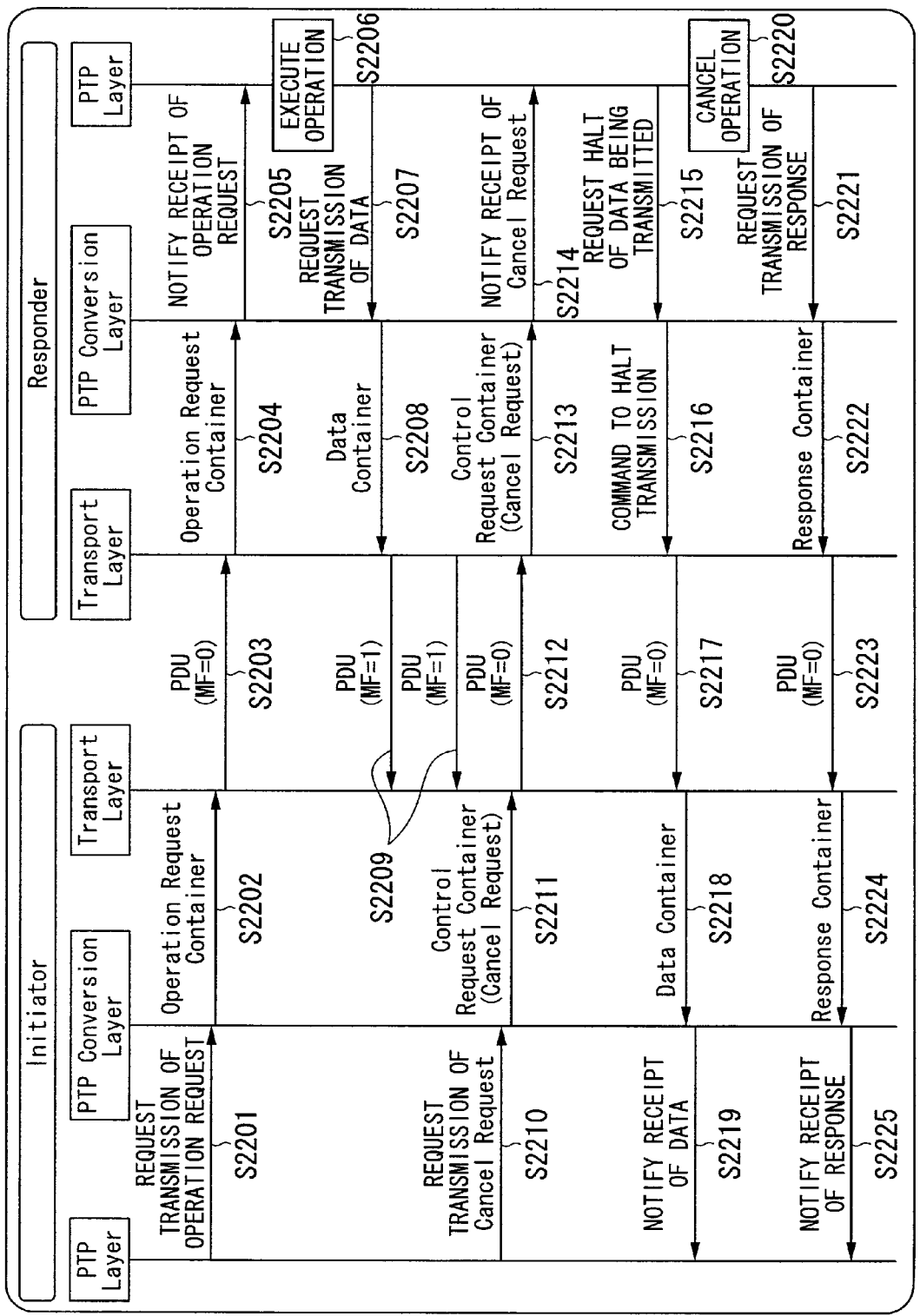
FIG. 22 is a sequence diagram illustrating the cancellation sequence of an operation by an initiator when a Cancel Request is used in case 3 in accordance with the first preferred embodiment of the present invention.

FIG. 22 is a sequence diagram illustrating the cancellation sequence of an operation by an initiator when a Cancel Request is used in case 3 of this embodiment.

The processes of steps S2201 to S2206 are similar to those of steps S2101 to S2106 in FIG. 21.

(Step S2207)

The PTP layer of the responder requests a data transmission.

(Step S2208)

The PTP conversion layer of the responder converts the data to a data container.

(Step S2209)

The transport layer of the responder converts the data to a plurality of PDUs (MF=1) and transmits them to the initiator.

(Step S2210)

The PTP layer of the initiator requests the PTP conversion layer of the initiator to transmit a Cancel Request in order to cancel the operation.

(Step S2211)

The PTP conversion layer of the initiator converts the Cancel Request to a control request container (Cancel Request).

(Step S2212)

The transport layer of the initiator converts the control request container (Cancel Request) to a PDU (MF=0), and transmits it to the responder.

(Step S2213)

The transport layer of the responder receives the transmitted PDU (MF=0), and converts it to a control request container (Cancel Request).

(Step S2214)

The PTP conversion layer of the responder notifies the PTP layer of the responder that it has received a Cancel Request.

(Step S2215)

The PTP layer of the responder requests a transmission halt.

(Step S2216)

The PTP conversion layer of the responder commands the transport layer to halt the transmission.

(Step S2217)

The transport layer of the responder sets the More Frame of the next PDU to be transmitted to 0, and transmits it to the initiator.

(Step S2218)

The transport layer of the initiator receives the transmitted PDU (MF=0), and accordingly converts the PDU (MF=1) and PDU (MF=0) it has hitherto received to a data container.

(Step S2219)

The PTP conversion layer of the initiator notifies the PTP layer of the initiator that it has received the data.

The processes of steps S2220 to S2225 are similar to those of steps S2112 to S2117 in FIG. 21.

As described above, the operation in case 3 can be cancelled by implementing the following sequence:
1. The initiator transmits a Cancel Request.
2. The responder transmits data (PDU) in which More Frame is set to 0. The initiator ignores the data it has received.
3. The responder cancels the operation.
4. The responder sets the Code to a response code of 'transaction cancelled' and transmits a response.

Figure 23:
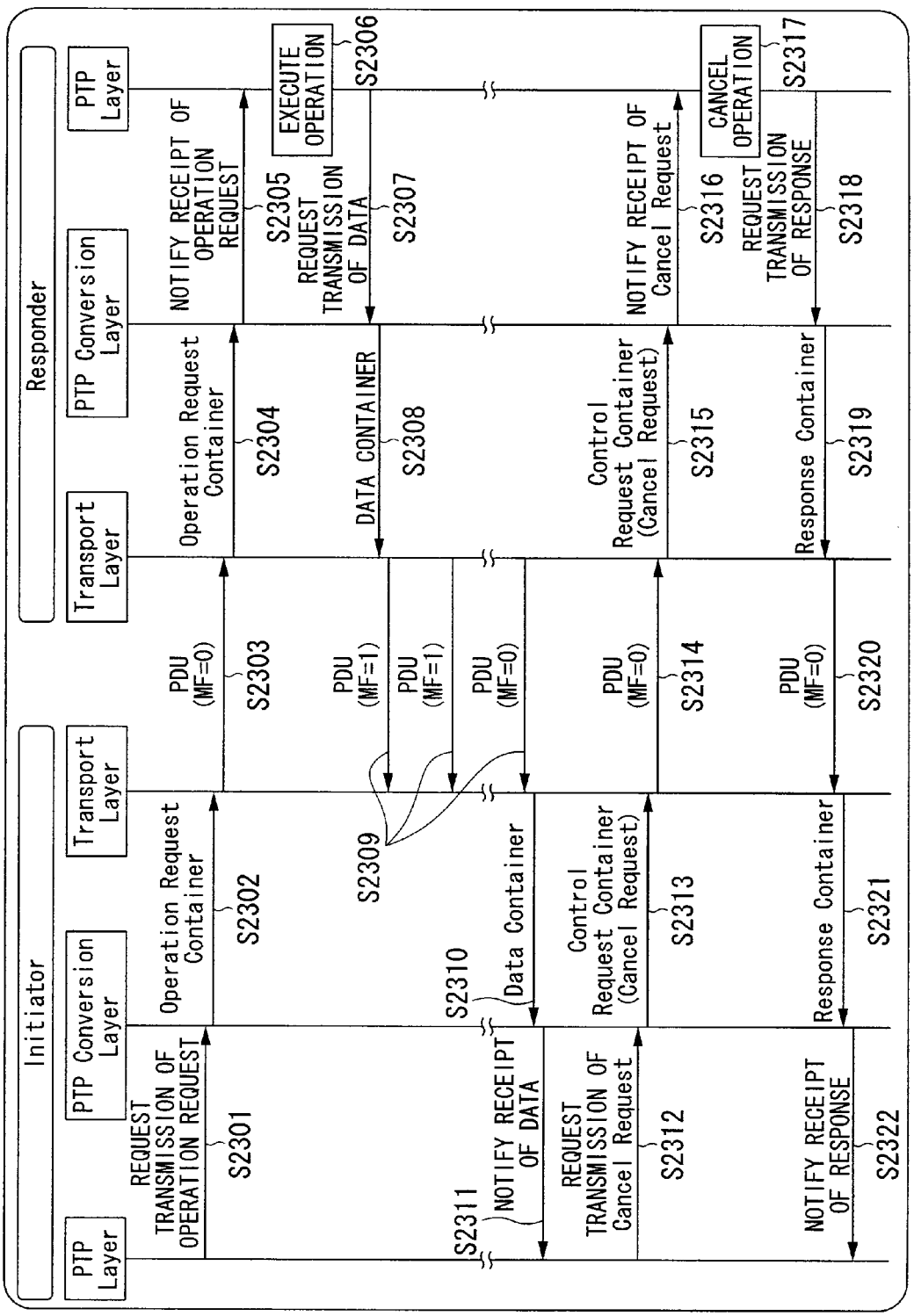
FIG. 23 is a sequence diagram illustrating the cancellation sequence of an operation by an initiator when a Cancel Request is used in case 4 in accordance with the first preferred embodiment of the present invention.

FIG. 23 is a sequence diagram illustrating the cancellation sequence of an operation by an initiator when a Cancel Request is used in case 4 of this embodiment.

The processes of steps S2301 to S2306 are similar to those of steps S2101 to S2106 in FIG. 21.

(Step S2307)

The PTP layer of the responder requests a data transmission.

(Step S2308)

The PTP conversion layer of the responder converts the data to a data container.

(Step S2309)

The transport layer of the responder converts the data to a plurality of PDUs (MF=1) and PDUs (MF=0), and transmits them to the initiator.

(Step S2310)

The transport layer of the initiator has received the transmitted PDU (MF=0), and accordingly converts the PDU (MF=1) and PDU (MF=0) it has hitherto received to a data container.

(Step S2311)

The PTP conversion layer of the initiator notifies the PTP layer of the initiator that it has received the data.

(Step S2312)

The PTP layer of the initiator requests the PTP conversion layer of the initiator to transmit a Cancel Request in order to cancel the operation.

(Step S2313)

The PTP conversion layer of the initiator converts the Cancel Request to a control request container (Cancel Request).

(Step S2314)

The transport layer of the initiator converts the control request container (Cancel Request) to a PDU (MF=0), and transmits it to the responder.

(Step S2315)

The transport layer of the responder receives the transmitted PDU (MF=0), and converts it to a control request container (Cancel Request).

(Step S2316)

The PTP conversion layer of the responder notifies the PTP layer of the responder that it has received a Cancel Request.

The processes of steps S2317 to S2322 are similar to those of steps S2112 to S2117 in FIG. 21.

As described above, the operation in case 4 can be cancelled by implementing the following sequence:
1. The initiator transmits a Cancel Request.
2. The responder cancels the operation.
3. The responder sets the Code to a response code of 'transaction cancelled' and transmits a response.

Figure 24:
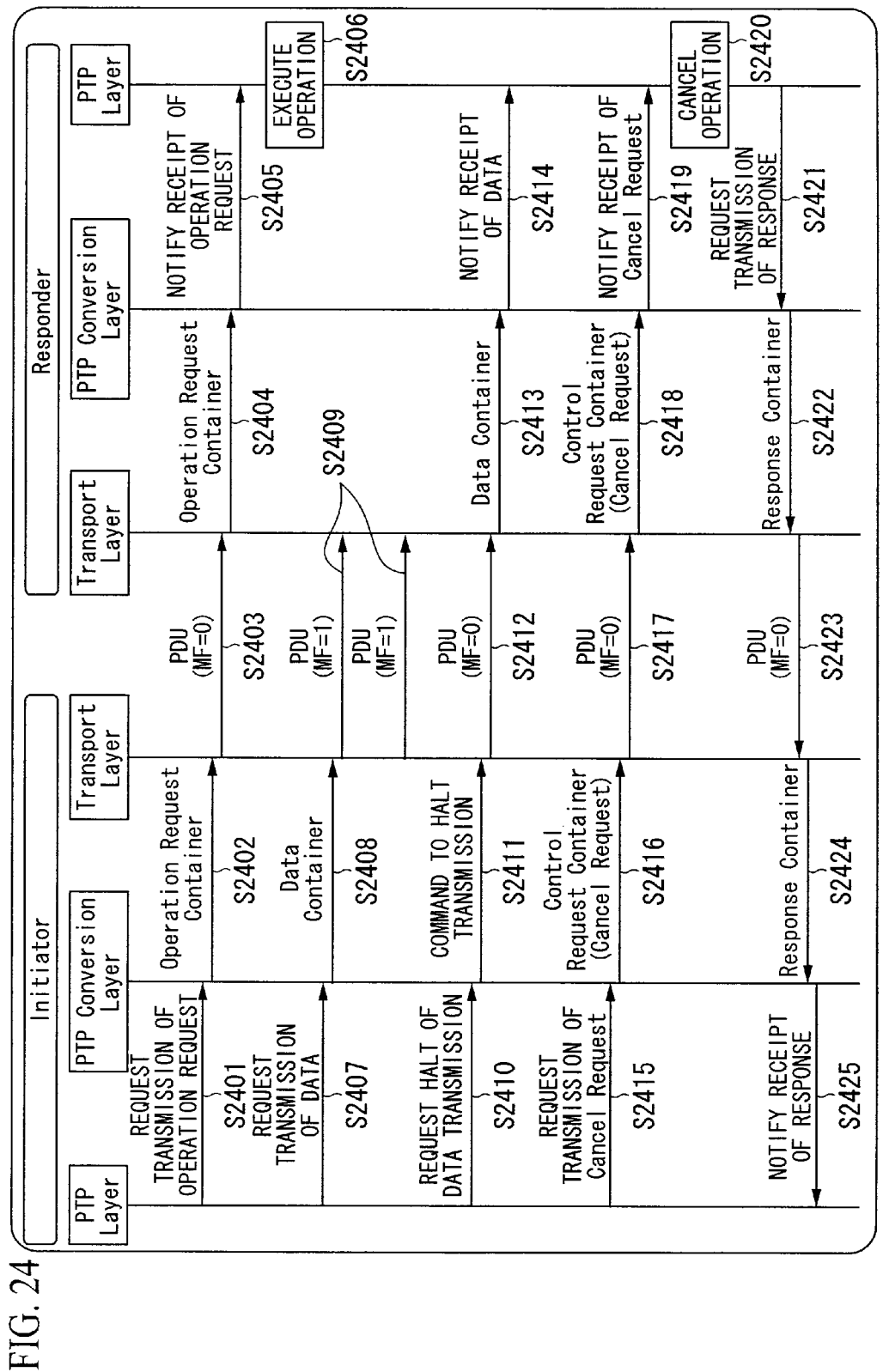
FIG. 24 is a sequence diagram illustrating the cancellation sequence of an operation by an initiator when a Cancel Request is used in case 6 in accordance with the first preferred embodiment of the present invention.

FIG. 24 is a sequence diagram illustrating the cancellation sequence of an operation by an initiator when a Cancel Request is used in case 6 of this embodiment.

The processes of steps S2401 to S2406 are similar to those of steps S2101 to S2106 in FIG. 21.

(Step S2407)

The PTP layer of the initiator requests a data transmission.

(Step S2408)

The PTP conversion layer of the initiator converts the data to a data container.

(Step S2409)

The transport layer of the initiator converts the data to a plurality of PDUs (MF=1) and transmits them to the responder.

(Step S2410)

The PTP layer of the initiator makes a transmission halt request to the PTP conversion layer of the initiator in order to halt the transmission of data.

(Step S2411)

The PTP conversion layer of the initiator commands the transport layer of the initiator to halt the transmission.

(Step S2412)

The transport layer of the initiator sets More Frame in the next PDU to be transmitted to 0, and transmits it to the responder.

(Step S2413)

The transport layer of the responder receives the transmitted PDU (MF=0), and accordingly converts the PDU (MF=1) and PDU (MF=0) it has hitherto received to a data container.

(Step S2414)

The PTP conversion layer of the responder notifies the PTP layer of the responder that it has received the data.

(Step S2415)

The PTP layer of the initiator requests the PTP conversion layer of the initiator to transmit a Cancel Request in order to cancel the operation.

(Step S2416)

The PTP conversion layer of the initiator converts the Cancel Request to a control request container (Cancel Request).

(Step S2417)

The transport layer of the initiator converts the control request container (Cancel Request) to a PDU (MF=0), and transmits it to the responder.

(Step S2418)

The transport layer of the responder receives the transmitted PDU (MF=0), and converts it to a control request container (Cancel Request).

(Step S2419)

The PTP conversion layer of the responder notifies the PTP layer of the responder that it has received a Cancel Request.

The processes of steps S2420 to S2425 are similar to those of steps S2112 to S2117 in FIG. 21.

As described above, the operation in case 6 can be cancelled by implementing the following sequence:

1. The initiator transmits data (PDU) in which More Frame is set to 0. The responder ignores the data it has received.
2. The initiator transmits a Cancel Request.
3. The responder cancels the operation.
4. The responder sets the Code to a response code of 'transaction cancelled' and transmits a response.

Figure 25:
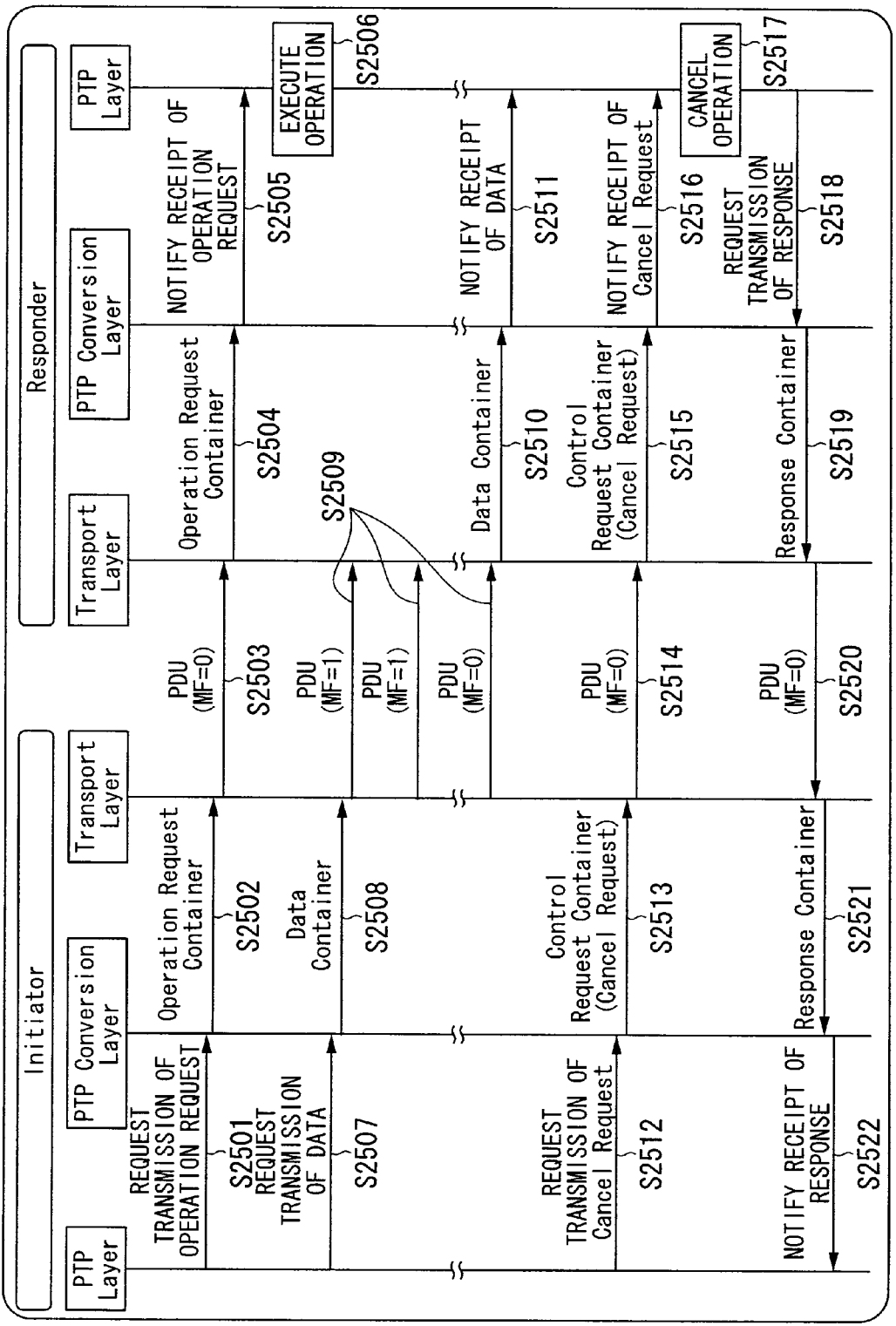
FIG. 25 is a sequence diagram illustrating the cancellation sequence of an operation by an initiator when a Cancel Request is used in case 7 in accordance with the first preferred embodiment of the present invention.

FIG. 25 is a sequence diagram illustrating the cancellation sequence of an operation by an initiator when a Cancel Request is used in case 7 of this embodiment.

The processes of steps S2501 to S2506 are similar to those of steps S2101 to S2106 in FIG. 21.

(Step S2507)

The PTP layer of the initiator requests a data transmission.

(Step S2508)

The PTP conversion layer of the initiator converts the data to a data container.

(Step S2509)

The transport layer of the initiator converts the data to a plurality of PDUs (MF=1) and PDUs (MF=0) and transmits them to the responder.

(Step S2510)

The transport layer of the responder has received the transmitted PDU (MF=0), and accordingly converts the PDUs (MF=1) and PDUs (MF=0) hitherto received to a data container.

(Step S2511)

The PTP conversion layer of the responder notifies the PTP data of the responder that the data has been received.

(Step S2512)

The PTP layer of the initiator requests the PTP conversion layer of the initiator to transmit a Cancel Request in order to cancel the operation.

(Step S2513)

The PTP conversion layer of the initiator converts the Cancel Request to a control request container (Cancel Request).

(Step S2514)

The transport layer of the initiator converts the control request container (Cancel Request) to a PDU (MF=0), and transmits it to the responder.

(Step S2515)

The transport layer of the responder receives the transmitted PDU (MF=0), and converts it to a control request container (Cancel Request).

(Step S2516)

The PTP conversion layer of the responder notifies the PTP layer of the responder that it has received a Cancel Request.

The processes of steps S2517 to S2522 are similar to those of steps S2112 to S2117 in FIG. 21.

As described above, the operation in case 7 can be cancelled by implementing the following sequence:

1. The initiator transmits a Cancel Request.
2. The responder cancels the operation.
3. The responder sets the code to a response code of 'transaction cancelled' and transmits a response.

Figure 26:
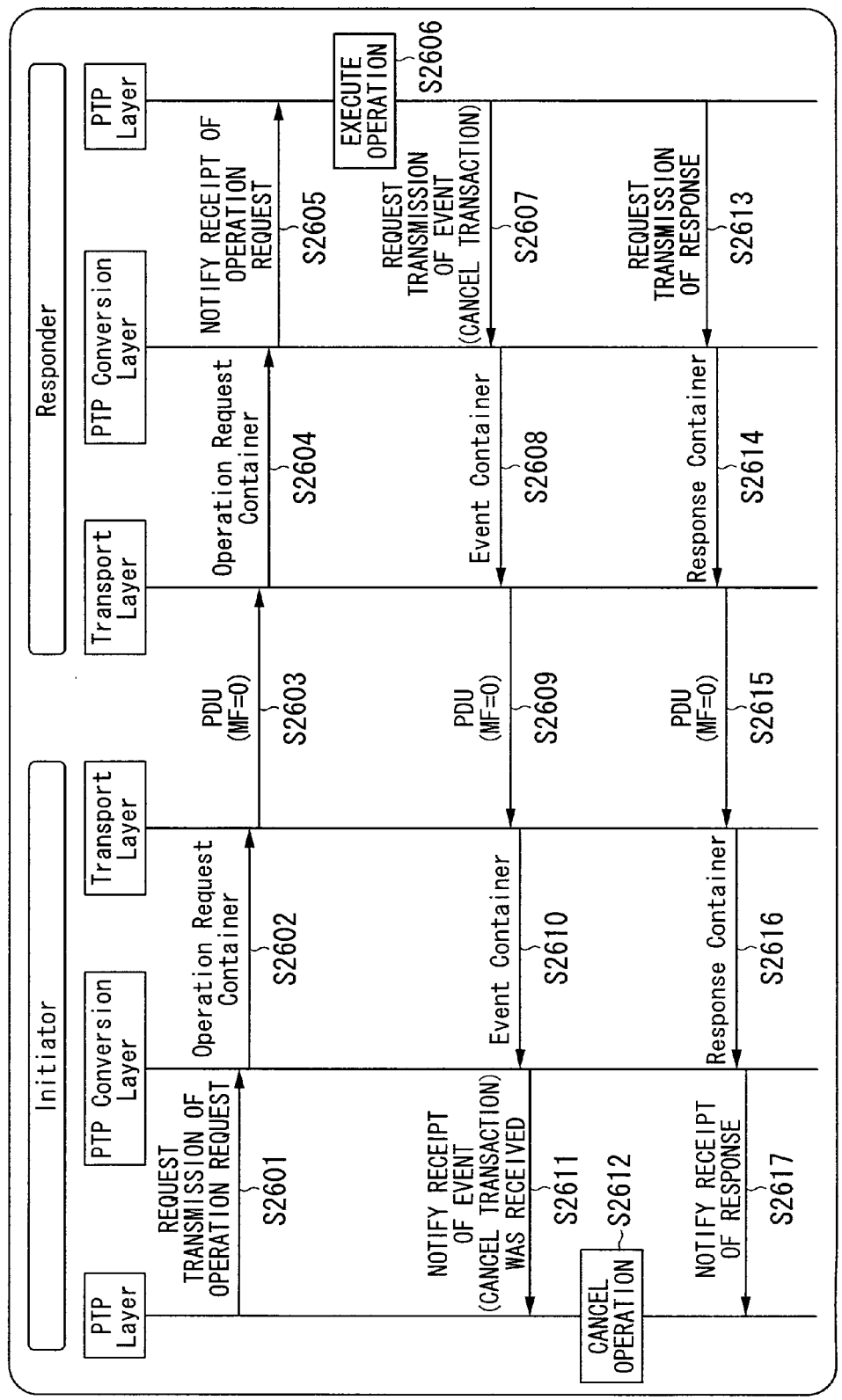
FIG. 26 is a sequence diagram illustrating the cancellation sequence of an operation by a responder when a cancel transaction event is used in case 1 and case 2 in accordance with the first preferred embodiment of the present invention.

Subsequently, operation cancellation sequence executed by the responder when using a cancel transaction event in cases 1 to 7 will be explained. FIG. 26 is a sequence diagram illustrating the cancellation sequence of an operation by a responder when a cancel transaction event is used in case 1 and case 2 of this embodiment.

The processes of steps S2601 to S2606 are similar to those of steps S2101 to S2106 in FIG. 21.

(Step S2607)

The PTP layer of the responder requests the PTP conversion layer of the responder to transmit an event (cancel transaction) in order to cancel the operation.

(Step S2608)

The PTP conversion layer of the responder converts the event (cancel transaction) to an event container (cancel transaction).

(Step S2609)

The transport layer of the responder converts the event container (cancel transaction) to a PDU (MF=0), and transmits it to the initiator.

(Step S2610)

The transport layer of the initiator receives the transmitted PDU (MF=0), and converts it to an event container (cancel transaction).

(Step S2611)

The PTP conversion layer of the responder notifies the PTP layer of the responder that it has received an event (cancel transaction).

(Step S2612)

The PTP layer of the initiator cancels the operation.

The processes of steps S2613 to S2617 are similar to those of steps S2113 to S2117 in FIG. 21.

As described above, an operation in cases 1 and 2 can be cancelled by implementing the following sequence.

1. The responder sets the code to an event code of 'cancel transaction' and transmits an event.
2. The initiator cancels the operation.

3. The responder sets the code to a response code of 'transaction cancelled' and transmits a response.

Figure 27:
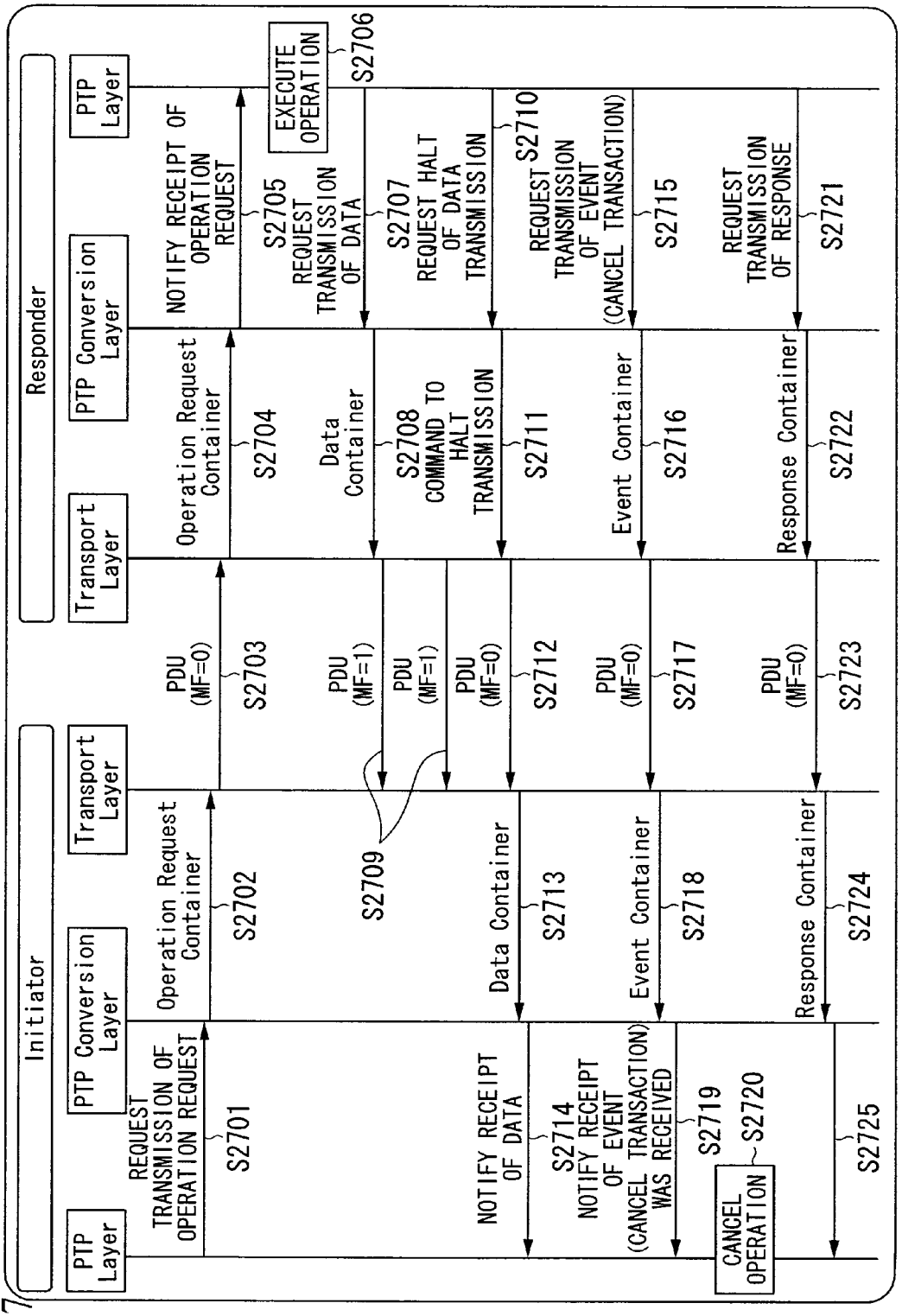
FIG. 27 is a sequence diagram illustrating the cancellation sequence of an operation by a responder when a cancel transaction event is used in case 3 in accordance with the first preferred embodiment of the present invention.

FIG. 27 is a sequence diagram illustrating the cancellation sequence of an operation by a responder when a cancel transaction event is used in case 3 of this embodiment.

The processes of steps S2701 to S2706 are similar to those of steps S2101 to S2106 in FIG. 21.

(Step S2707)

The PTP layer of the responder requests a data transmission.

(Step S2708)

The PTP conversion layer of the responder converts the data to a data container.

(Step S2709)

The transport layer of the responder converts the data to a plurality of PDUs (MF=1), and transmits them to the initiator.

(Step S2710)

The PTP layer of the responder makes a transmission halt request to the PTP conversion layer of the responder in order to halt the transmission of data.

(Step S2711)

The PTP conversion layer of the responder commands the transport layer of the responder to halt the transmission.

(Step S2712)

The transport layer of the responder sets More Frame in the next PDU to be transmitted to 0, and transmits it to the initiator.

(Step S2713)

The transport layer of the initiator has received the transmitted PDU (MF=0), and accordingly converts the PDUs (MF=1) and PDUs (MF=0) it has hitherto received to a data container.

(Step S2714)

The PTP conversion layer of the initiator notifies the PTP layer of the initiator that it has received the data.

(Step S2715)

The PTP layer of the responder requests the PTP conversion layer of the responder to transmit an event (cancel transaction) in order to cancel the operation.

(Step S2716)

The PTP conversion layer of the responder converts the event (cancel transaction) to an event container (cancel transaction).

(Step S2717)

The transport layer of the responder converts the event container (cancel transaction) to a PDU (MF=0), and transmits it to the initiator.

(Step S2718)

The transport layer of the initiator receives the transmitted PDU (MF=0), and converts it to an event container (cancel transaction).

(Step S2719)

The PTP conversion layer of the responder notifies the PTP layer of the responder that it has received the event (cancel transaction).

(Step S2720)

The PTP layer of the initiator cancels the operation.

The processes of steps S2721 to S2725 are similar to those of steps S2112 to S2117 in FIG. 21.

As described above, an operation in case 3 can be cancelled by implementing the following sequence:

1. The responder transmits data (PDU) in which More Frame is set to 0. The initiator ignores the data it has received.

2. The responder sets the code to an event code of 'cancel transaction' and transmits the event.

3. The initiator cancels the operation.

4. The responder sets the code to a response code of 'transaction cancelled' and transmits a response.

Figure 28:
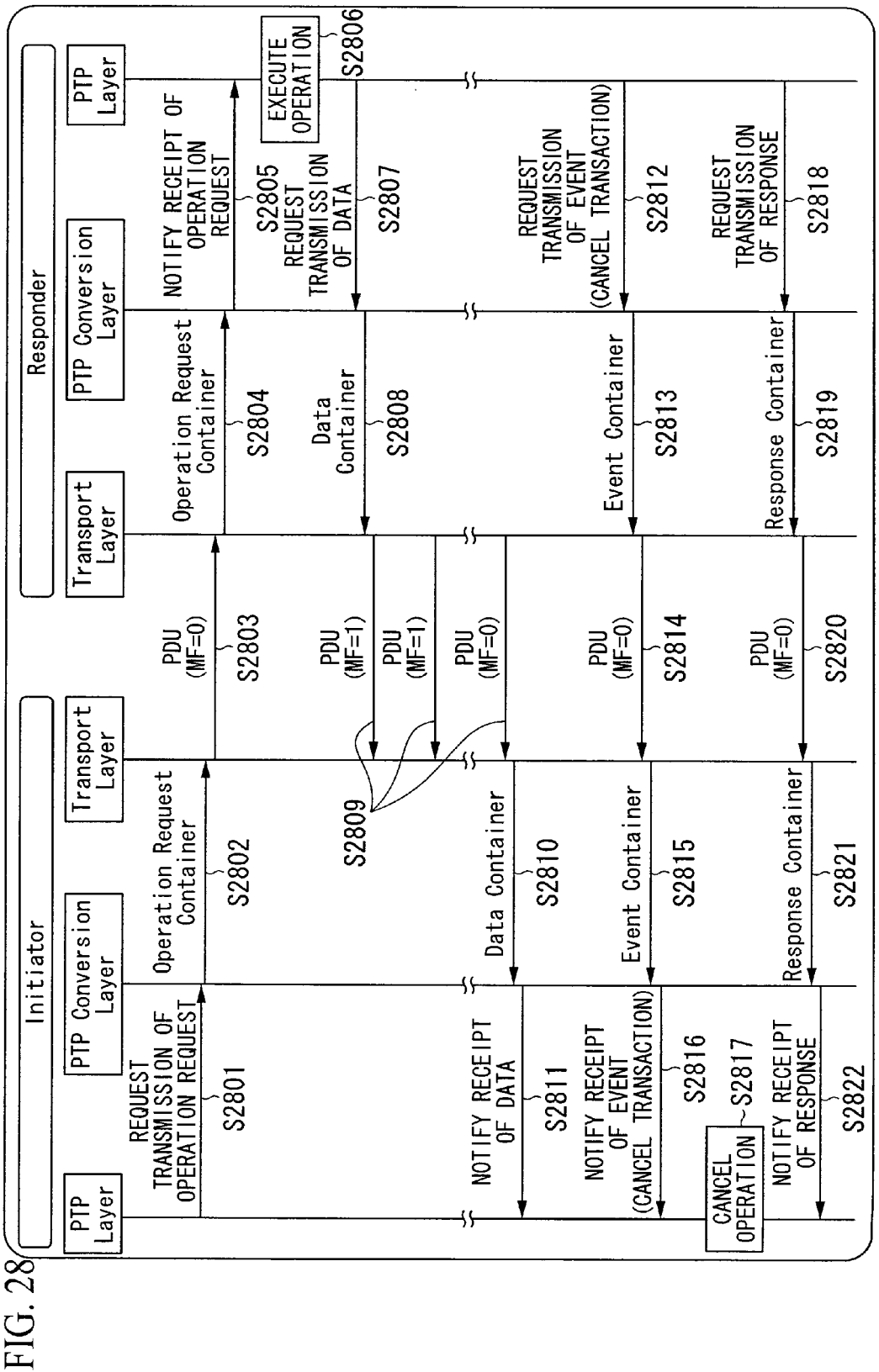
FIG. 28 is a sequence diagram illustrating the cancellation sequence of an operation by a responder when a cancel transaction event is used in case 4 in accordance with the first preferred embodiment of the present invention.

FIG. 28 is a sequence diagram illustrating the cancellation sequence of an operation by a responder when a cancel transaction event is used in case 4 of this embodiment.

The processes of steps S2801 to S2806 are similar to those of steps S2101 to S2106 in FIG. 21.

(Step S2807)

The PTP layer of the responder requests a data transmission.

(Step S2808)

The PTP conversion layer of the responder converts the data to a data container.

(Step S2809)

The transport layer of the responder converts the data to a plurality of PDUs (MF=1) and PDUs (MF=0) and transmits them to the initiator.

(Step S2810)

The transport layer of the initiator has received the transmitted PDU (MF=0), and accordingly converts the PDUs (MF=1) and PDUs (MF=0) hitherto received to a data container.

(Step S2811)

The PTP conversion layer of the initiator notifies the PTP data of the initiator that the data has been received.

(Step S2812)

The PTP layer of the responder requests the PTP conversion layer of the responder to transmit an event (cancel transaction) in order to cancel the operation.

(Step S2813)

The PTP conversion layer of the responder converts the event (cancel transaction) to an event container (cancel transaction).

(Step S2814)

The transport layer of the responder converts the event container (cancel transaction) to a PDU (MF=0), and transmits it to the initiator.

(Step S2815)

The transport layer of the responder receives the transmitted PDU (MF=0), and converts it to a control request container (Cancel Request).

(Step S2816)

The PTP conversion layer of the responder notifies the PTP layer of the responder that it has received a Cancel Request.

(Step S2817)

The PTP layer of the initiator cancels the operation.

The processes of steps S2818 to S2822 are similar to those of steps S2113 to S2117 in FIG. 21.

As described above, an operation in case 4 can be cancelled by implementing the following sequence:

1. The responder sets the code to an event code of 'cancel transaction' and transmits the event.

2. The initiator cancels the operation.

3. The responder sets the code to a response code of 'transaction cancelled' and transmits a response.

Figure 29:
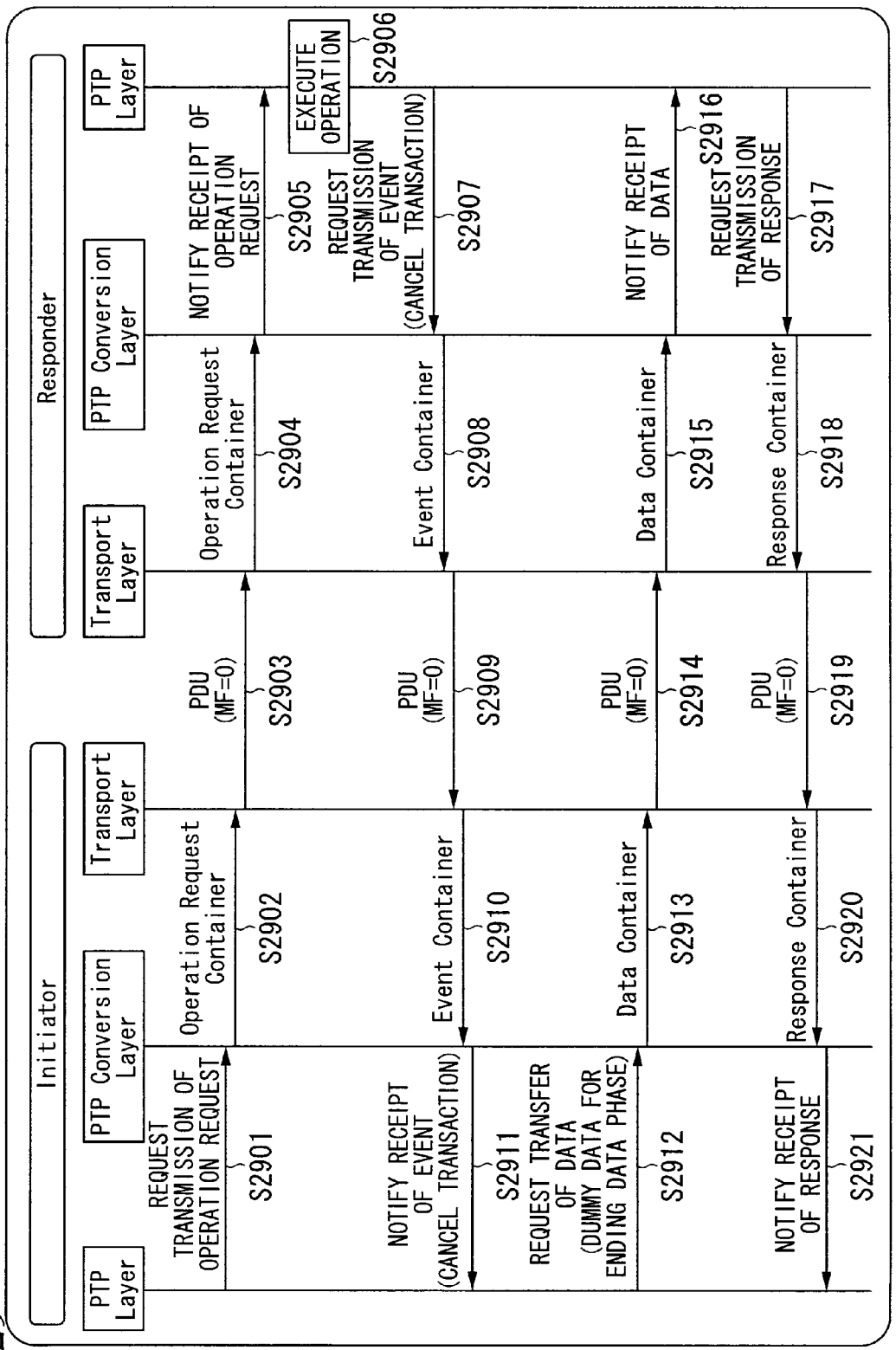
FIG. 29 is a sequence diagram illustrating the cancellation sequence of an operation by a responder when a cancel transaction event is used in case 5 in accordance with the first preferred embodiment of the present invention.

FIG. 29 is a sequence diagram illustrating the cancellation sequence of an operation by a responder when a cancel transaction event is used in case 5 of this embodiment.

The processes of steps S2901 to S2906 are similar to those of steps S2101 to S2106 in FIG. 21.

(Step S2907)

The PTP layer of the responder requests the PTP conversion layer of the responder to transmit an event (cancel transaction) in order to cancel the operation.

(Step S2908)

The PTP conversion layer of the responder converts the event (cancel transaction) to an event container (cancel transaction).

(Step S2909)

The transport layer of the responder converts the event container (cancel transaction) to a PDU (MF=0), and transmits it to the initiator.

(Step S2910)

The transport layer of the initiator receives the transmitted PDU (MF=0), and converts it to an event container (cancel transaction).

(Step S2911)

The PTP conversion layer of the responder notifies the PTP layer of the responder that it has received the event (cancel transaction).

(Step S2912)

The PTP layer of the initiator requests transmission of dummy data for ending the data phase.

(Step S2913)

The PTP conversion layer of the initiator converts the data to a data container.

(Step S2914)

The transport layer of the initiator converts the data to a PDU (MF=0), and transmits it to the responder.

(Step S2915)

The transport layer of the responder has received the transmitted PDU (MF=0), and accordingly converts the PDU (MF=0) to a data container.

(Step S2916)

The PTP conversion layer of the responder notifies the PTP data of the responder that the data has been received.

The processes of steps S2917 to S2921 are similar to those of steps S2113 to S2117 in FIG. 21.

As described above, an operation in case 5 can be cancelled by implementing the following sequence:

1. The responder sets the code to an event code of 'cancel transaction' and transmits the event.
2. The initiator cancels the operation.
3. The initiator transmits data (PDU) in which More Frame is set to 0. The responder ignores the data it has received.
4. The responder sets the code to a response code of 'transaction cancelled' and transmits a response.

Figure 30:
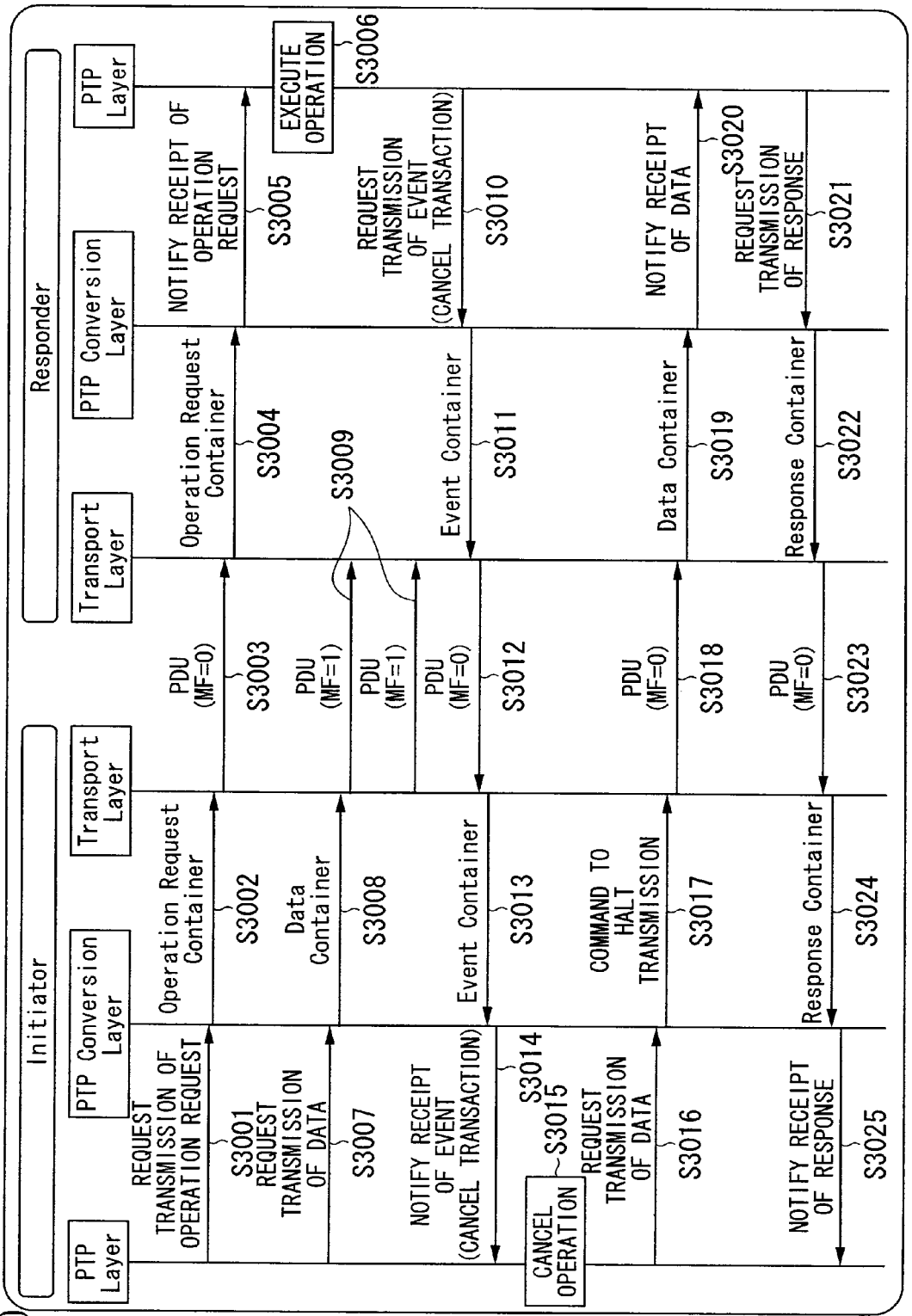
FIG. 30 is a sequence diagram illustrating the cancellation sequence of an operation by a responder when a cancel transaction event is used in case 6 in accordance with the first preferred embodiment of the present invention.

FIG. 30 is a sequence diagram illustrating the cancellation sequence of an operation by a responder when a cancel transaction event is used in case 6 of this embodiment.

The processes of steps S3001 to S3006 are similar to those of steps S2101 to S2106 of FIG. 21.

(Step S3007)

The PTP layer of the initiator makes a request to transmit data.

(Step S3008)

The PTP conversion layer of the initiator converts the data to a data container.

(Step S3009)

The transport layer of the initiator converts the data to a plurality of PDUs (MF=1), and transmits them to the responder.

(Step S3010)

The PTP layer of the responder requests the PTP conversion layer of the responder to transmit an event (cancel transaction) in order to cancel the operation.

(Step S3011)

The PTP conversion layer of the responder converts the event (cancel transaction) to an event container (cancel transaction).

(Step S3012)

The transport layer of the responder converts the event container (cancel transaction) to a PDU (MF=0), and transmits it to the initiator.

(Step S3013)

The transport layer of the initiator receives the transmitted PDU (MF=0), and converts it to an even container (cancel transaction).

(Step S3014)

The PTP conversion layer of the responder notifies the PTP layer of the responder that it has received the data.

(Step S3015)

The PTP layer of the initiator cancels the operation.

(Step S3016)

The PTP layer of the initiator makes a transmission halt request to the PTP conversion layer of the initiator in order to halt the transmission of data.

(Step S3017)

The PTP conversion layer of the initiator commands the transport layer of the initiator to halt the transmission.

(Step S3018)

The transport layer of the initiator sets More Frame in the next PDU to be transmitted to 0, and transmits it to the responder.

(Step S3019)

The transport layer of the responder has received the transmitted PDU (MF=0), and accordingly converts the PDUs (MF=1) and PDUs (MF=0) it has hitherto received to a data container.

(Step S3020)

The PTP conversion layer of the responder notifies the PTP layer of the responder that it has received the data.

The processes of steps S3021 to S3025 are similar to those of steps S2113 to S2117 in FIG. 21.

As described above, an operation in case 6 can be cancelled by implementing the following sequence:

1. The responder sets the code to an event code of 'cancel transaction' and transmits the event.
2. The initiator cancels the operation.
3. The initiator transmits data (PDU) in which More Frame is set to 0. The responder ignores the data it has received.
4. The responder sets the code to a response code of 'transaction cancelled' and transmits a response.

Figure 31:
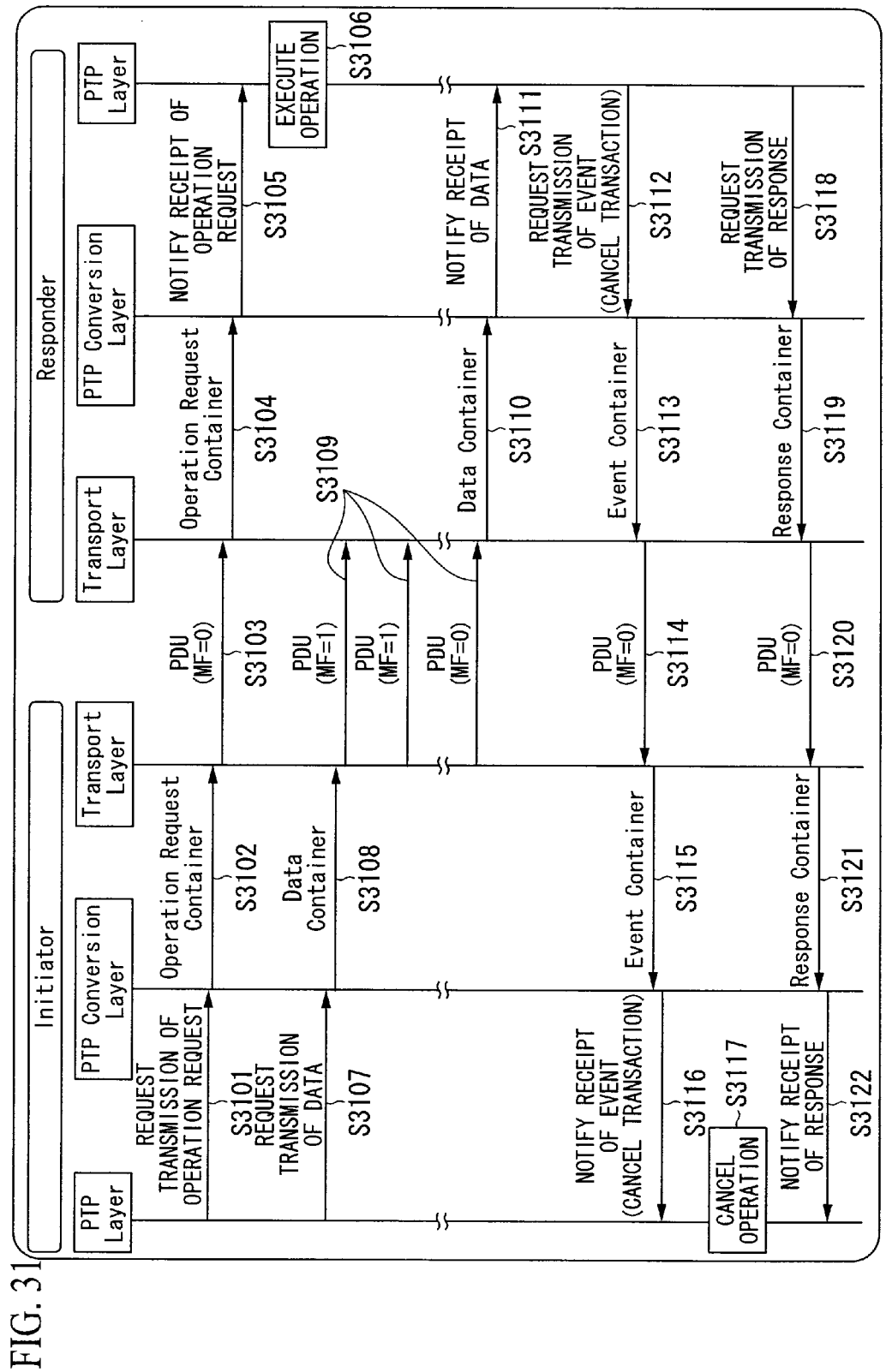
FIG. 31 is a sequence diagram illustrating the cancellation sequence of an operation by a responder when a cancel transaction event is used in case 7 in accordance with the first preferred embodiment of the present invention.

FIG. 31 is a sequence diagram illustrating the cancellation sequence of an operation by a responder when a cancel transaction event is used in case 7 of this embodiment.

The processes of steps S3101 to S3106 are similar to those of steps S2101 to S2106 in FIG. 21.

(Step S3107)

The PTP layer of the initiator requests a data transmission.

(Step S3108)

The PTP conversion layer of the initiator converts the data to a data container.

(Step S3109)

The transport layer of the initiator converts the data to a plurality of PDUs (MF=1) and PDUs (MF=0) and transmits them to the responder.

(Step S3110)

The transport layer of the responder has received the transmitted PDU (MF=0), and accordingly converts the PDUs (MF=1) and PDUs (MF=0) hitherto received to a data container.

(Step S3111)

The PTP conversion layer of the responder notifies the PTP data of the responder that the data has been received.

(Step S3112)
The PTP layer of the responder requests the PTP conversion layer of the responder to transmit an event (cancel transaction) in order to cancel the operation.
(Step S3113)
The PTP conversion layer of the responder converts the event (cancel transaction) to an event container (cancel transaction).
(Step S3114)
The transport layer of the responder converts the event container (cancel transaction) to a PDU (MF=0), and transmits it to the initiator.
(Step S3115)
The transport layer of the initiator receives the transmitted PDU (MF=0), and converts it to an event container (cancel transaction).
(Step S3116)
The PTP conversion layer of the responder notifies the PTP layer of the responder that it has received an event (cancel transaction).
(Step S3117)
The PTP layer of the initiator cancels the operation.
The processes of steps S3118 to S3122 are similar to those of steps S2113 to S2117 in FIG. 21.
As described above, an operation in case 6 can be cancelled by implementing the following sequence:
1. The responder sets the code to an event code of 'cancel transaction' and transmits the event.
2. The initiator cancels the operation.
3. The responder sets the code to a response code of 'transaction cancelled' and transmits a response.

Figure 32:
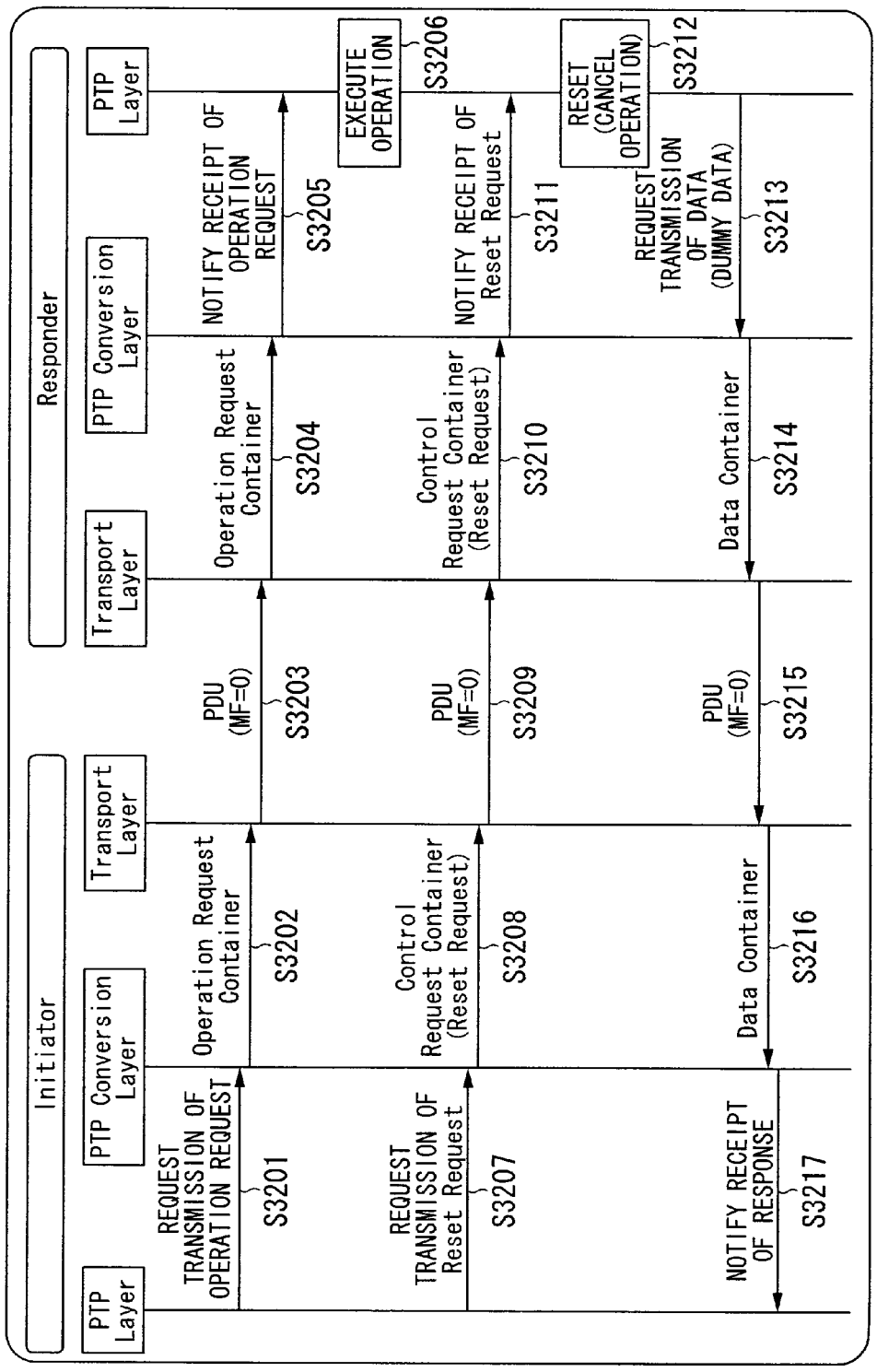
FIG. 32 is a sequence diagram illustrating the cancellation sequence of an operation by an initiator when a Reset Request is used in case 1, case 2, and case 5 in accordance with the first preferred embodiment of the present invention.
Figure 33:
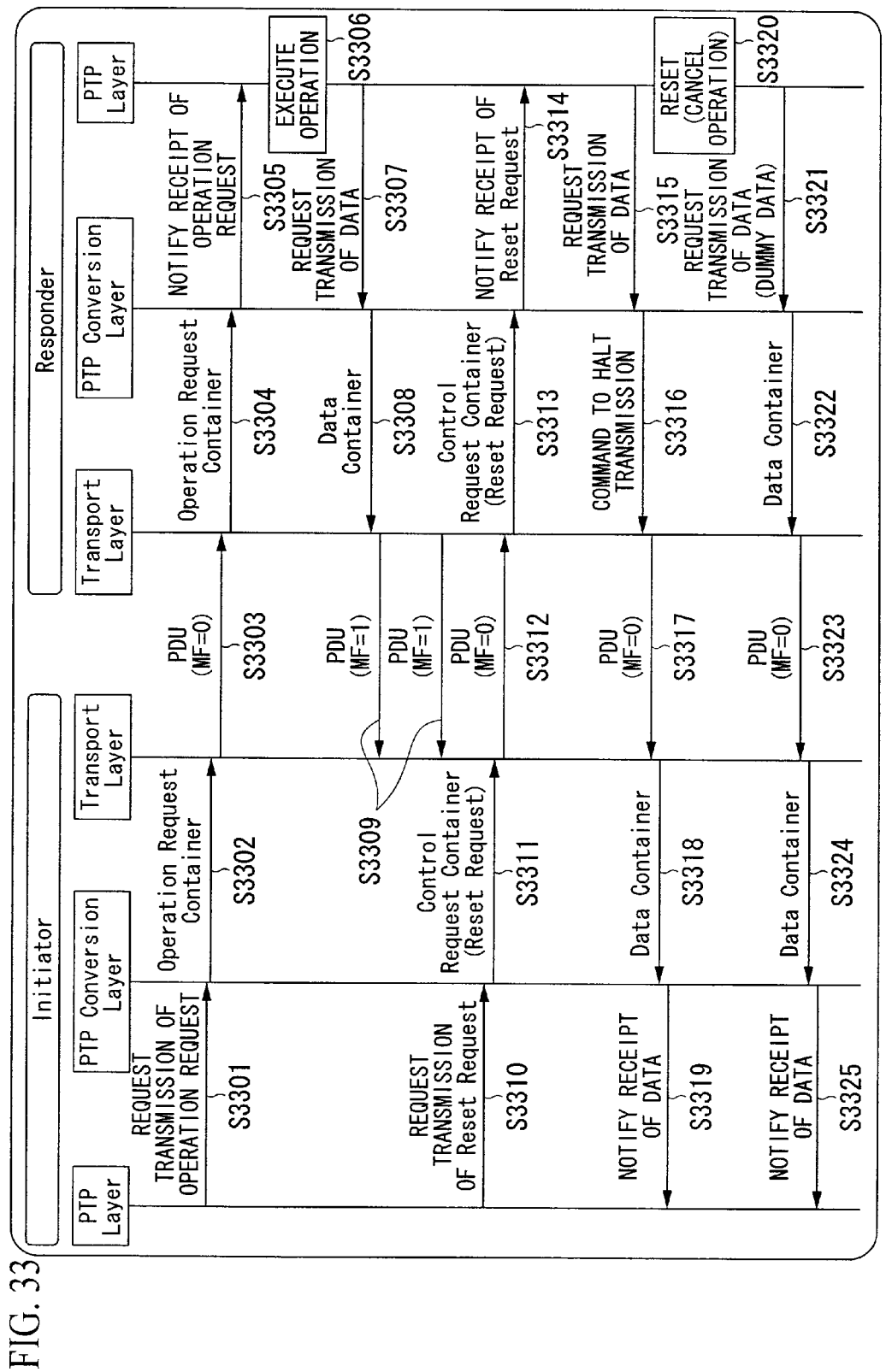
FIG. 33 is a sequence diagram illustrating the cancellation sequence of an operation by an initiator when a Reset Request is used in case 3 in accordance with the first preferred embodiment of the present invention.

Subsequently, an operation cancellation sequence performed by the initiator when Reset Request is used in cases 1 to 7 will be explained. FIG. 32 is a sequence diagram illustrating the cancellation sequence of an operation by an initiator when a Reset Request is used in case 1, case 2, and case 5 of this embodiment.
The processes of steps S3201 to S3206 are similar to those of steps S2101 to S2106 in FIG. 21.
(Step S3207)
The PTP layer of the initiator makes a request to the PTP conversion layer of the initiator to transmit a Reset Request in order to cancel the operation.
(Step S3208)
The PTP conversion layer of the initiator converts the Reset Request to a control request container (Reset Request).
(Step S3209)
The transport layer of the initiator converts the control request container (Reset Request) to a PDU (MF=0), and transmits it to the responder.
(Step S3210)
The transport layer of the responder receives the transmitted PDU (MF=0) and converts it to a control request container (Reset Request).
(Step S3211)
The PTP conversion layer of the responder notifies the PTP layer of the responder that it has received the Reset Request.
(Step S3212)
The PTP layer of the responder resets the process (cancels the operation).
(Step S3213)
The PTP layer of the responder requests transmission of dummy data.
(Step S3214)
The PTP conversion layer of the initiator converts the data to a data container.
(Step S3215)
The transport layer of the initiator converts the data to a PDU (MF=0), and transmits it to the responder.
(Step S3216)
The transport layer of the responder has received the transmitted PDU (MF=0), and accordingly converts the PDU (MF=0) to a data container.
(Step S3217)
The PTP conversion layer of the responder notifies the PTP data of the responder that the data has been received.
As described above, an operation in cases 1, 2, and 5 can be cancelled by implementing the following sequence:
1. The initiator transmits a Reset Request.
2. The responder cancels the operation.
3. The responder transmits dummy data in which More Frame is set to 0. The initiator ignores the data it has received.
4. The operation phase state is changed to the idle state.
FIG. 33 is a sequence diagram illustrating the cancellation sequence of an operation by an initiator when a Reset Request is used in case 3 of this embodiment.
The processes of steps S3301 to S3306 are similar to those of steps S2101 to S2106 of FIG. 21.
(Step S3307)
The PTP layer of the responder requests a data transmission.
(Step S3308)
The PTP conversion layer of the responder converts the data to a data container.
(Step S3309)
The transport layer of the responder converts the data to a plurality of PDUs (MF=1) and transmits them to the initiator.
(Step S3310)
To cancel the operation, the PTP layer of the initiator requests the PTP conversion layer of the initiator to transmit a Reset Request.
(Step S3311)
The PTP conversion layer of the initiator converts the Reset Request to a control request container (Reset Request).
(Step S3312)
The transport layer of the initiator converts the control request container (Reset Request) to a PDU (MF=0), and transmits it to the responder.
(Step S3313)
The transport layer of the responder receives the transmitted PDU (MF=0), and converts it to a control request container (Reset Request).
(Step S3314)
The PTP conversion layer of the responder notifies the PTP layer of the responder that it has received a Reset Request.
(Step S3315)
The PTP layer of the responder requests a transmission halt.
(Step S3316)
The PTP conversion layer of the responder commands the transport layer to halt the transmission.
(Step S3317)
The transport layer of the responder sets the More Frame of the next PDU to be transmitted to 0, and transmits it to the initiator.
(Step S3318)
The transport layer of the initiator receives the transmitted PDU (MF=0), and accordingly converts the PDUs (MF=1) and PDUs (MF=0) it has hitherto received to a data container.
(Step S3319)
The PTP conversion layer of the initiator notifies the PTP layer of the initiator that it has received the data.

The processes of steps S3320 to S3325 are similar to those of steps S3212 to S3217 in FIG. 32.

As described above, the operation in case 3 can be cancelled by implementing the following sequence:

1. The initiator transmits a Reset Request.
2. The responder transmits data (PDU) in which More Frame is set to 0. The initiator ignores the data it has received.
3. The responder cancels the operation.
4. The responder sets the Code to a response code of 'transaction cancelled' and transmits a response.
5. The operation phase state is changed to the idle state.

Figure 34:
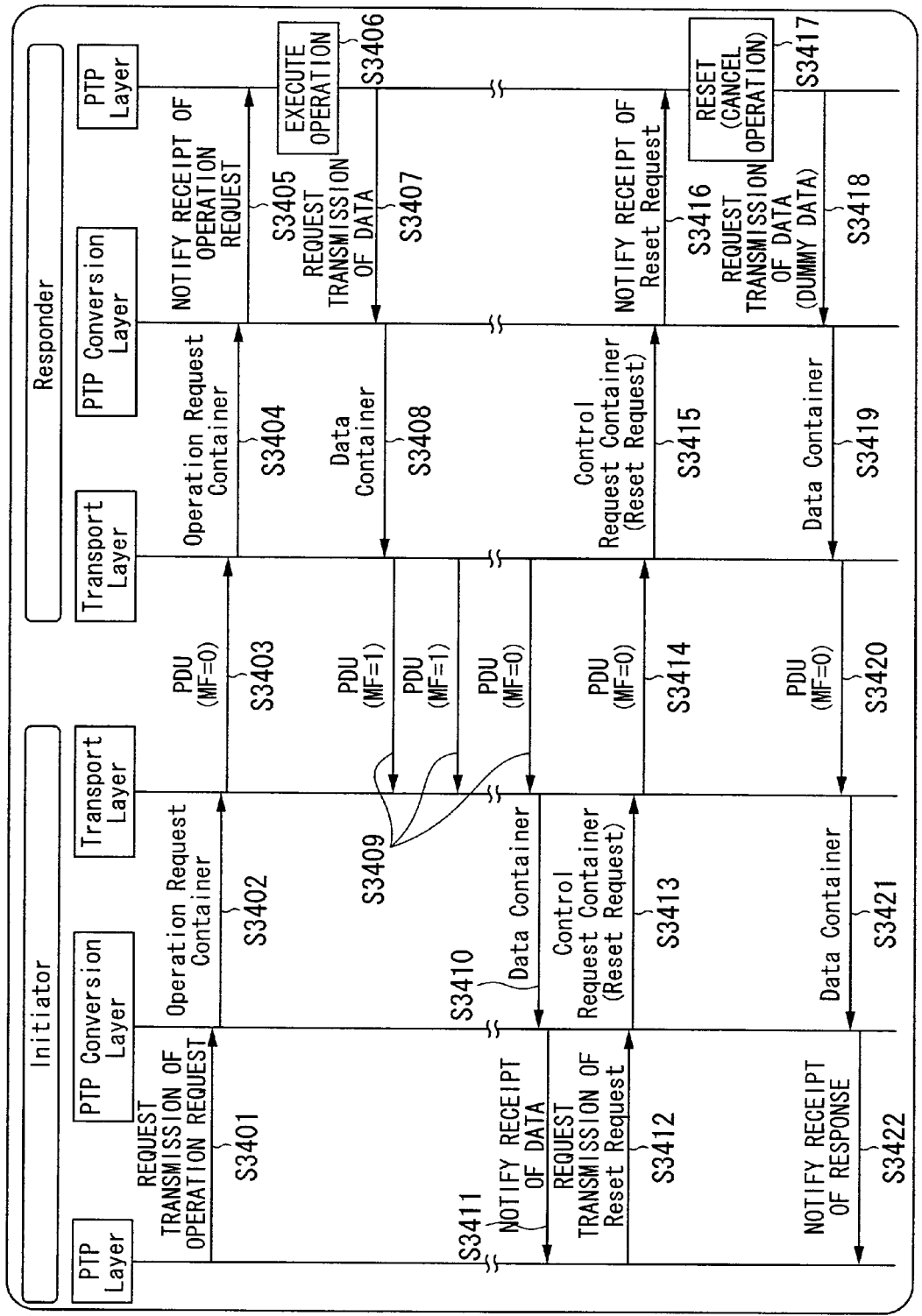
FIG. 34 is a sequence diagram illustrating the cancellation sequence of an operation by an initiator when a Reset Request is used in case 4 in accordance with the first preferred embodiment of the present invention.

FIG. 34 is a sequence diagram illustrating the cancellation sequence of an operation by an initiator when a Reset Request is used in case 4 of this embodiment.

The processes of steps S3401 to S3406 are similar to those of steps S2101 to S2106 in FIG. 21.

(Step S3407)
The PTP layer of the responder requests a data transmission.

(Step S3408)
The PTP conversion layer of the responder converts the data to a data container.

(Step S3409)
The transport layer of the responder converts the data to a plurality of PDUs (MF=1) and PDUs (MF=0), and transmits them to the initiator.

(Step S3410)
The transport layer of the initiator has received the transmitted PDU (MF=0), and accordingly converts the PDU (MF=1) and PDU (MF=0) it has hitherto received to a data container.

(Step S3411)
The PTP conversion layer of the initiator notifies the PTP layer of the initiator that it has received the data.

(Step S3412)
The PTP layer of the initiator requests the PTP conversion layer of the initiator to transmit a Reset Request in order to cancel the operation.

(Step S3413)
The PTP conversion layer of the initiator converts the Cancel Request to a control request container (Reset Request).

(Step S3414)
The transport layer of the initiator converts the control request container (Reset Request) to a PDU (MF=0), and transmits it to the responder.

(Step S3415)
The transport layer of the responder receives the transmitted PDU (MF=0), and converts it to a control request container (Reset Request).

(Step S3416)
The PTP conversion layer of the responder notifies the PTP layer of the responder that it has received a Reset Request.

The processes of steps S3417 to S3422 are similar to those of steps S2112 to S2117 in FIG. 21.

As described above, the operation in case 4 can be cancelled by implementing the following sequence:

1. The initiator transmits a Reset Request.
2. The responder cancels the operation.
3. The responder transmits dummy data with more frame set to 0. The initiator ignores the data it has received.
4. The operation phase state is changed to the idle state.

Figure 35:
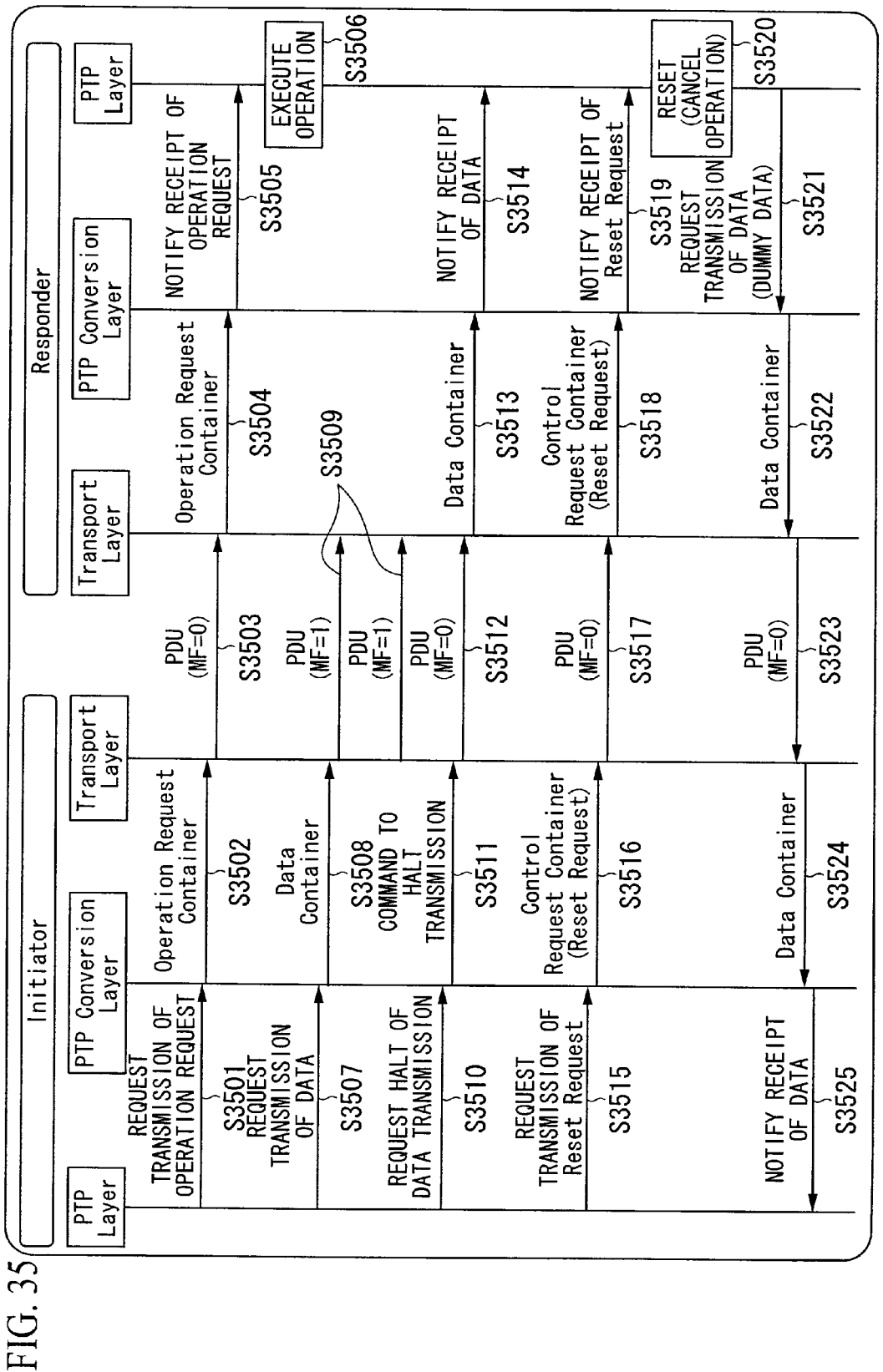
FIG. 35 is a sequence diagram illustrating the cancellation sequence of an operation by an initiator when a Reset Request is used in case 6 in accordance with the first preferred embodiment of the present invention.

FIG. 35 is a sequence diagram illustrating the cancellation sequence of an operation by an initiator when a Reset Request is used in case 6 of this embodiment.

The processes of steps S3501 to S3506 are similar to those of steps S2101 to S2106 in FIG. 21.

(Step S3507)
The PTP layer of the initiator requests a data transmission.

(Step S3508)
The PTP conversion layer of the initiator converts the data to a data container.

(Step S3509)
The transport layer of the initiator converts the data to a plurality of PDUs (MF=1) and transmits them to the responder.

(Step S3510)
The PTP layer of the initiator makes a transmission halt request to the PTP conversion layer of the initiator in order to halt the transmission of data.

(Step S3511)
The PTP conversion layer of the initiator commands the transport layer of the initiator to halt the transmission.

(Step S3512)
The transport layer of the initiator sets More Frame in the next PDU to be transmitted to 0, and transmits it to the responder.

(Step S3513)
The transport layer of the responder has received the transmitted PDU (MF=0), and accordingly converts the PDUs (MF=1) and PDUs (MF=0) it has hitherto received to a data container.

(Step S3514)
The PTP conversion layer of the responder notifies the PTP layer of the responder that it has received the data.

(Step S3515)
The PTP layer of the initiator requests the PTP conversion layer of the initiator to transmit a Cancel Request in order to cancel the operation.

(Step S3516)
The PTP conversion layer of the initiator converts the Cancel Request to a control request container (Reset Request).

(Step S3517)
The transport layer of the initiator converts the control request container (Reset Request) to a PDU (MF=0), and transmits it to the responder.

(Step S3518)
The transport layer of the responder receives the transmitted PDU (MF=0), and converts it to a control request container (Reset Request).

(Step S3519)
The PTP conversion layer of the responder notifies the PTP layer of the responder that it has received a Reset Request.

The processes of steps S3520 to S3525 are similar to those of steps S3212 to S3217 in FIG. 32.

As described above, the operation in case 6 can be cancelled by implementing the following sequence:

1. The initiator transmits data (PDU) in which More Frame is set to 0. The responder ignores the data it has received.
2. The initiator transmits a Reset Request.
3. The responder cancels the operation.
4. The responder transmits data (PDU) in which More Frame is set to 0. The initiator ignores the data it has received.
5. The operation phase state is changed to the idle state.

Figure 36:
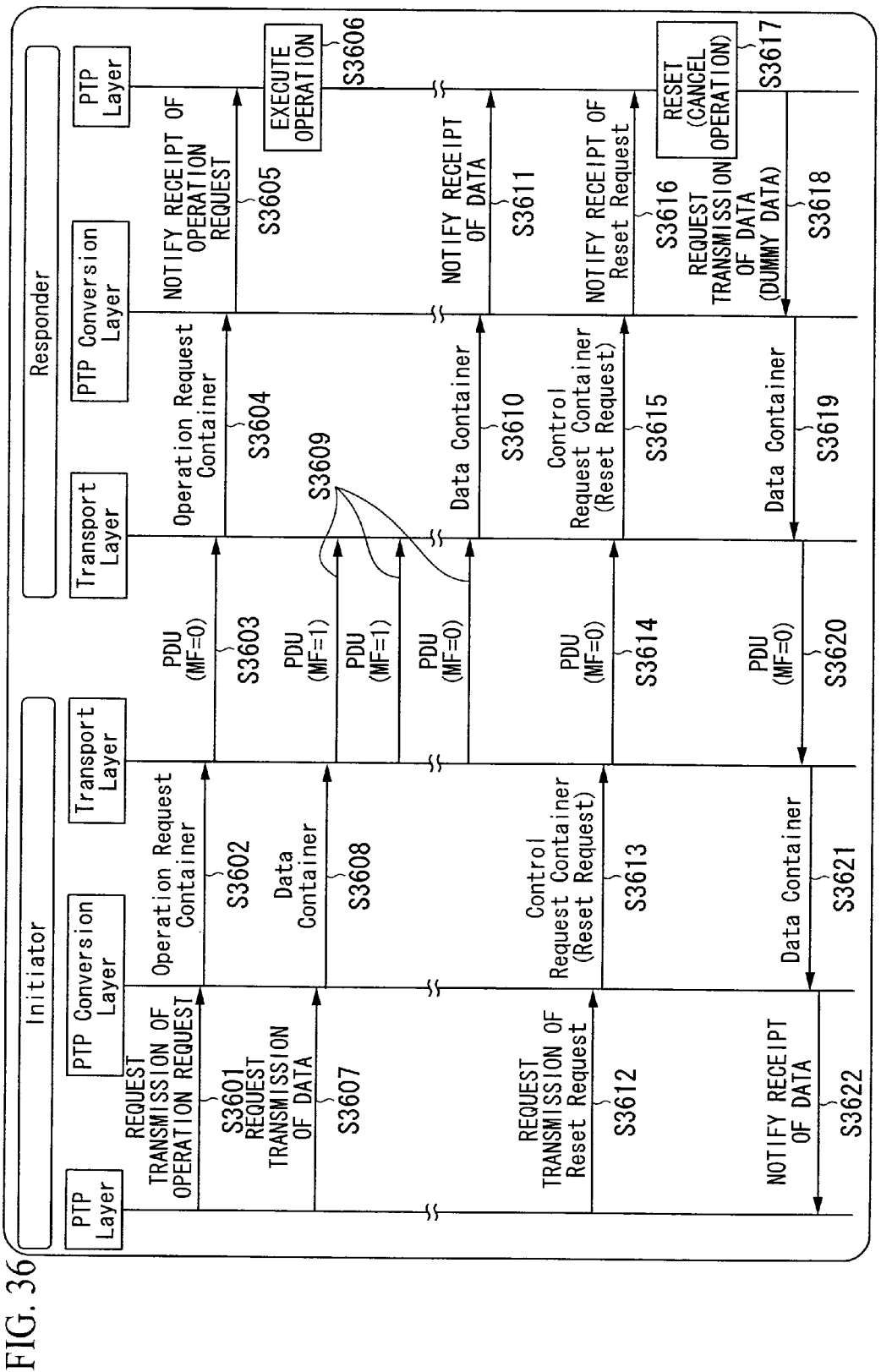
FIG. 36 is a sequence diagram illustrating the cancellation sequence of an operation by an initiator when a Reset Request is used in case 7 in accordance with the first preferred embodiment of the present invention.

FIG. 36 is a sequence diagram illustrating the cancellation sequence of an operation by an initiator when a Reset Request is used in case 7 of this embodiment.

The processes of steps S3601 to S3606 are similar to those of steps S2101 to S2106 in FIG. 21.
(Step S3607)
The PTP layer of the initiator requests a data transmission.
(Step S3608)
The PTP conversion layer of the initiator converts the data to a data container.
(Step S3609)
The transport layer of the initiator converts the data to a plurality of PDUs (MF=1) and PDUs (MF=0) and transmits them to the responder.
(Step S3610)
The transport layer of the responder has received the transmitted PDU (MF=0), and accordingly converts the PDUs (MF=1) and PDUs (MF=0) hitherto received to a data container.
(Step S3611)
The PTP conversion layer of the responder notifies the PTP data of the responder that the data has been received.
(Step S3612)
The PTP layer of the initiator requests the PTP conversion layer of the initiator to transmit a Reset Request in order to cancel the operation.
(Step S3613)
The PTP conversion layer of the initiator converts the Cancel Request to a control request container (Reset Request).
(Step S3614)
The transport layer of the initiator converts the control request container (Reset Request) to a PDU (MF=0), and transmits it to the responder.
(Step S3615)
The transport layer of the responder receives the transmitted PDU (MF=0), and converts it to a control request container (Reset Request).
(Step S3616)
The PTP conversion layer of the responder notifies the PTP layer of the responder that it has received a Reset Request.

The processes of steps S3617 to S3622 are similar to those of steps S3212 to S3217 in FIG. 32.

As described above, the operation in case 7 can be cancelled by implementing the following sequence:

1. The initiator transmits a Reset Request.
2. The responder cancels the operation.
3. The responder transmits dummy data in which More Frame is set to 0. The initiator ignores the data it has received.
4. The operation phase state is changed to the idle state.

When the initiator cancels an operation using a Reset Request, in a case where the initiator does not need to it know that the reset process of the responder has ended, it is acceptable to omit the process of 'The responder transmits dummy data in which More Frame is set to 0'.

As described above, in this embodiment, the generating unit 32 of the communication controllers 14 and 23 generates a communication frame of the transport layer level by converting and dividing transmission target data input to the first interface unit 31 from a processing unit 30 that performs processing in compliance with a communication protocol of an upper layer, and the second interface unit 33 outputs the communication frame generated by the generating unit 32.

At this time, when a trigger relating to halting transmission of the target data is inputted to the first interface unit 31 from the processing unit 30 of the communication controller 14 or 23, the generating unit 32 converts the trigger relating to halting transmission of the target data to information of the transport layer level.

Based on the information that the generating unit 32 converted, the setting unit 34 of the communication controllers 14 and 23 sets a flag indicating the end of transmission to the communication frame of the transport layer level to be transmitted next by the second interface unit 33. The second interface unit 33 then transmits the communication frame of the transport layer level to which the setting unit 34 set the flag indicating the end of transmission. Thus the communication controllers 14 and 23 notify the transmission destination that the data transmission is to be halted.

When the second interface unit 33 of the communication controllers 14 and 23 has received a communication frame of the transport layer level to which a flag indicating the end of transmission has been set, the first interface unit 31 outputs information indicating that the transmission of the transmission target data being transmitted from the target communication device is to be halted to the processing unit 30 that performs processing in compliance with a communication protocol of an upper layer.

Therefore, when one of the communication controllers 14 and 23 performs communication using a transport layer protocol which lacks an existing function of having control of data transfer, if the other of the communication controller 14 and 23 halts the data transmission, the one of the communication controller 14 and 23 that is executing the communication can confirm that the data transfer is halted.

Furthermore, when the second interface unit 33 of the communication controllers 14 and 23 inputs a second trigger relating to requesting halt of the transmission from a target communication device that is transmitting transmission target data, the first interface unit 31 outputs information corresponding to this second trigger to the processing unit 30 that performs processing in compliance with a communication protocol of an upper layer, and then receives the trigger relating to halting transmission of the target data. Thus the communication controllers 14 and 23 can be notified that the transmission of the data is to be halted.

As used herein, the following directional terms "forward, rearward, above, downward, right, left, vertical, horizontal, below, and transverse" as well as any other similar directional terms refer to those directions of an apparatus equipped with the present invention. Accordingly, these terms, as utilized to describe the present invention should be interpreted relative to an apparatus equipped with the present invention.

The term "configured" is used to describe a component, section or part of a device includes hardware and/or software that is constructed and/or programmed to carry out the desired function.

Moreover, terms that are expressed as "means-plus-function" in the claims should include any structure that can be utilized to carry out the function of that part of the present invention.

The terms of degree such as "substantially," "about," "nearly", and "approximately" as used herein mean a reasonable amount of deviation of the modified term such that the end result is not significantly changed. For example, these terms can be construed as including a deviation of at least ±5 percents of the modified term if this deviation would not negate the meaning of the word it modifies.

The term "unit" is used to describe a component, section or part of a hardware and/or software that is constructed and/or programmed to carry out the desired function. Typical examples of the hardware may include, but are not limited to, a device and a circuit.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the invention is not to be considered as being limited by the foregoing description, and is only limited by the scope of the claims.

What is claimed is:

1. A transmission module comprising:
a first interface unit that inputs transmission target data and a trigger relating to halting transmission of the transmission data from a processing unit that performs processing in compliance with a communication protocol of an upper layer;
a generating unit that generates a communication frame of a transport layer level corresponding to the transmission target data;
a second interface unit that transmits the generated communication frame;
a setting unit that, when the trigger is inputted while communication frame corresponding to the transmission target data are being sequentially transmitted, sets a flag indicating the termination of transmission of the transmission target data to communication frame among those being transmitted which do not correspond to a final portion of the transmission target data;
a converting unit that converts the transmission target data inputted by the first interface unit to information of the transport layer level; and
a dividing unit that divides the converted information into a plurality of divisions; and wherein
the generating unit generates a plurality of the communication frames based on the divided information, and
the setting unit sets the flag to communication frame corresponding to information among the divided information which does not correspond to a last-end of the divided information.

2. A transmission module comprising:
a first interface unit that inputs transmission target data and a trigger relating to halting transmission of the transmission data from a processing unit that performs processing in compliance with a communication protocol of an upper layer;
a generating unit that generates a communication frame of a transport layer level corresponding to the transmission target data;
a second interface unit that transmits the generated communication frame; and
a setting unit that, when the trigger is inputted while communication frame corresponding to the transmission target data are being sequentially transmitted, sets a flag indicating the termination of transmission of the transmission target data to communication frame among those being transmitted which do not correspond to a final portion of the transmission target data, wherein
the second interface unit receives a second trigger relating to a request to halt the transmission of the transmission target data, and
the first interface unit outputs information corresponding to the second trigger to the processing unit, and inputs the trigger after that outputting.

3. A reception module that receives transmission target data, the reception module comprising:
a second interface unit that receives a communication frame, among a plurality of communication frames corresponding to the transmission target data, which does not correspond to a final portion of the transmission target data, and to which a flag indicating the termination of transmission of the transmission target data has been set; and
a first interface unit that, when the second interface unit has received the communication frame to which a flag indicating the end of transmission has been set, outputs information indicating that the transmission of the transmission target data is to be halted to a processing unit that performs processing in compliance with a communication protocol of an upper layer, and wherein
the transmission target data is converted to information of the transport layer level,
the converted information is divided into a plurality of divisions,
a plurality of the communication frames are generated based on the divided information, and
the second interface unit receives a communication frame to which the flag is set corresponding to information among the divided information which does not correspond to a last-end of the divided information.

4. A reception module that receives transmission target data, the reception module comprising:
a second interface unit that receives a communication frame, among a plurality of communication frames corresponding to the transmission target data, which does not correspond to a final portion of the transmission target data, and to which a flag indicating the termination of transmission of the transmission target data has been set; and
a first interface unit that, when the second interface unit has received the communication frame to which a flag indicating the end of transmission has been set, outputs information indicating that the transmission of the transmission target data is to be halted to a processing unit that performs processing in compliance with a communication protocol of an upper layer, wherein
the first interface unit inputs a third trigger relating to a request to halt the transmission of the transmission target data, and
the second interface unit transmits information corresponding to the third trigger while it is sequentially receiving the transmission target data.

5. A transmission method comprising:
a step of inputting transmission target data and a trigger relating to halting transmission of the transmission data from a processing unit that performs processing in compliance with a communication protocol of an upper layer;
a step of generating a communication frame of a transport layer level corresponding to the transmission target data;
a step of transmitting the generated communication frames;
a step of setting a flag indicating the termination of transmission of the transmission target data to communication frames among those being transmitted which do not correspond to a final portion of the transmission target data, when the trigger is inputted while communication frames corresponding to the transmission target data are being sequentially transmitted;
a step of converting the inputted transmission target data to information of the transport layer level;
a step of dividing the converted information into a plurality of divisions;
a step of generating a plurality of the communication frames based on the divided information; and
a step of setting the flag to communication frame corresponding to information among the divided information which does not correspond to a last-end of the divided information.

6. A transmission method comprising:
a step of inputting transmission target data and a trigger relating to halting transmission of the transmission data from a processing unit that performs processing in compliance with a communication protocol of an upper layer;
a step of generating a communication frame of a transport layer level corresponding to the transmission target data;
a step of transmitting the generated communication frames;
a step of setting a flag indicating the termination of transmission of the transmission target data to communication frames among those being transmitted which do not correspond to a final portion of the transmission target data, when the trigger is inputted while communication frames corresponding to the transmission target data are being sequentially transmitted;
a step of receiving a second trigger relating to a request to halt the transmission of the transmission target data; and
a step of outputting information corresponding to the second trigger, and inputting the trigger after that outputting.

7. A reception method comprising:
a step of receiving a communication frame, among a plurality of communication frames corresponding to the transmission target data, which does not correspond to a final portion of the transmission target data, and to which a flag indicating the termination of transmission of the transmission target data has been set; and
a step of outputting information indicating that the transmission of the transmission target data is to be halted to a processing unit that performs processing in compliance with a communication protocol of an upper layer, when the second interface unit has received the communication frame to which a flag indicating the end of transmission has been set; and
a step of receiving a communication frame to which the flag is set corresponding to information among the divided information which does not correspond to a last-end of the divided information, the transmission target data being converted to information of the transport layer level, the converted information being divided into a plurality of divisions, a plurality of the communication frames being generated based on the divided information.

8. A reception method comprising:
a step of receiving a communication frame, among a plurality of communication frames corresponding to the transmission target data, which does not correspond to a final portion of the transmission target data, and to which a flag indicating the termination of transmission of the transmission target data has been set; and
a step of outputting information indicating that the transmission of the transmission target data is to be halted to a processing unit that performs processing in compliance with a communication protocol of an upper layer, when the second interface unit has received the communication frame to which a flag indicating the end of transmission has been set;
a step of inputting a third trigger relating to a request to halt the transmission of the transmission target data; and
a step of transmitting information corresponding to the third trigger while sequentially receiving the transmission target data.

9. A communication system comprising:
a transmission module including:
a first interface unit that inputs transmission target data and a trigger relating to halting transmission of the transmission data from a processing unit that performs processing in compliance with a communication protocol of an upper layer;
a generating unit that generates one or a plurality of communication frames of a transport layer level corresponding to the transmission target data;
a second interface unit that transmits the generated communication frames; and
a setting unit that, when the trigger is inputted while communication frames corresponding to the transmission target data are being sequentially transmitted, sets a flag indicating the termination of transmission of the transmission target data to communication frames among those being transmitted which do not correspond to a final portion of the transmission target data; and
a reception module including:
a second interface unit that receives a communication frame, among a plurality of communication frames corresponding to the transmission target data, which does not correspond to a final portion of the transmission target data, and to which a flag indicating the termination of transmission of the transmission target data has been set; and
a first interface unit that, when the second interface unit has received the communication frame to which a flag indicating the end of transmission has been set, outputs information indicating that the transmission of the transmission target data is to be halted to a processing unit that performs processing in compliance with a communication protocol of an upper layer,
the transmission module further comprising:
a converting unit that converts the transmission target data inputted by the first interface unit to information of the transport layer level;
a dividing unit that divides the converted information into a plurality of divisions; and wherein
the generating unit generates a plurality of the communication frames based on the divided information, and
the setting unit sets the flag to communication frame corresponding to information among the divided information which does not correspond to a last-end of the divided information.

10. A communication system comprising:
a transmission module including:
a first interface unit that inputs transmission target data and a trigger relating to halting transmission of the transmission data from a processing unit that performs processing in compliance with a communication protocol of an upper layer;
a generating unit that generates one or a plurality of communication frames of a transport layer level corresponding to the transmission target data;
a second interface unit that transmits the generated communication frames; and
a setting unit that, when the trigger is inputted while communication frames corresponding to the transmission target data are being sequentially transmitted, sets a flag indicating the termination of transmission of the transmission target data to communication frames among those being transmitted which do not correspond to a final portion of the transmission target data; and a reception module including:
- a second interface unit that receives a communication frame, among a plurality of communication frames corresponding to the transmission target data, which does not correspond to a final portion of the transmission target data, and to which a flag indicating the termination of transmission of the transmission target data has been set; and
- a first interface unit that, when the second interface unit has received the communication frame to which a flag indicating the end of transmission has been set, outputs information indicating that the transmission of the transmission target data is to be halted to a processing unit that performs processing in compliance with a communication protocol of an upper layer the second interface unit receives a second trigger relating to a request to halt the transmission of the transmission target data, and the first interface unit outputs information corresponding to the second trigger to the processing unit, and inputs the trigger after that outputting.

11. A communication system comprising:

a transmission module including:
- a first interface unit that inputs transmission target data and a trigger relating to halting transmission of the transmission data from a processing unit that performs processing in compliance with a communication protocol of an upper layer;
- a generating unit that generates one or a plurality of communication frames of a transport layer level corresponding to the transmission target data;
- a second interface unit that transmits the generated communication frames; and
- a setting unit that, when the trigger is inputted while communication frames corresponding to the transmission target data are being sequentially transmitted, sets a flag indicating the termination of transmission of the transmission target data to communication frames among those being transmitted which do not correspond to a final portion of the transmission target data; and a reception module including:
- a second interface unit that receives a communication frame, among a plurality of communication frames corresponding to the transmission target data, which does not correspond to a final portion of the transmission target data, and to which a flag indicating the termination of transmission of the transmission target data has been set; and
- a first interface unit that, when the second interface unit has received the communication frame to which a flag indicating the end of transmission has been set, outputs information indicating that the transmission of the transmission target data is to be halted to a processing unit that performs processing in compliance with a communication protocol of an upper layer, wherein the first interface unit inputs a third trigger relating to a request to halt the transmission of the transmission target data, and the second interface unit transmits information corresponding to the third trigger while it is sequentially receiving the transmission target data.

* * * * *